United States Patent
Matsumoto

(10) Patent No.: US 7,231,603 B2
(45) Date of Patent: Jun. 12, 2007

(54) COMMUNICATION APPARATUS, COMMUNICATION SYSTEM, VIDEO IMAGE DISPLAY CONTROL METHOD, STORAGE MEDIUM AND PROGRAM

(75) Inventor: Yuichi Matsumoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 671 days.

(21) Appl. No.: 10/165,320

(22) Filed: Jun. 10, 2002

(65) Prior Publication Data
US 2003/0001878 A1    Jan. 2, 2003

(30) Foreign Application Priority Data
Jun. 14, 2001    (JP)    ............... 2001/180432

(51) Int. Cl.
*H04N 5/45*    (2006.01)
*H04N 5/765*    (2006.01)

(52) U.S. Cl. .................. 715/716; 348/14.08; 348/19; 348/564

(58) Field of Classification Search ................ 715/720, 715/716, 856, 762; 348/14.15
See application file for complete search history.

(56) References Cited

U.S. PATENT DOCUMENTS

| | | | |
|---|---|---|---|
| 4,742,350 A * | 5/1988 | Ko et al. ..................... 345/359 |
| 4,833,542 A * | 5/1989 | Hara et al. ................... 348/383 |
| 5,047,858 A * | 9/1991 | Aimonoya ............... 348/218.1 |
| 5,258,837 A * | 11/1993 | Gormley ..................... 348/441 |
| 5,258,839 A * | 11/1993 | Bae ............................. 348/473 |
| 5,305,100 A * | 4/1994 | Choi ........................... 348/159 |
| 5,375,068 A * | 12/1994 | Palmer et al. .............. 709/204 |
| 5,408,247 A * | 4/1995 | Enomoto et al. ........... 345/100 |
| 5,481,274 A * | 1/1996 | Aratani et al. ................ 345/98 |
| 5,488,385 A * | 1/1996 | Singhal et al. ............... 345/3.1 |
| 5,508,736 A * | 4/1996 | Cooper ....................... 348/144 |
| 5,537,153 A * | 7/1996 | Shigihara ..................... 725/56 |
| 5,579,239 A * | 11/1996 | Freeman et al. ......... 348/14.01 |
| 5,585,821 A * | 12/1996 | Ishikura et al. ............. 715/856 |
| 5,602,983 A * | 2/1997 | Naba et al. .................. 345/501 |
| 5,606,336 A * | 2/1997 | Yuki ........................... 345/1.1 |
| 5,648,824 A * | 7/1997 | Dunn et al. ................... 725/88 |
| 5,652,845 A * | 7/1997 | Arai et al. ................... 710/106 |
| 5,673,079 A * | 9/1997 | Satoh ........................ 348/14.1 |
| 5,736,981 A * | 4/1998 | Nobutani et al. ........... 345/574 |

(Continued)

OTHER PUBLICATIONS

U.S. Appl. No. 09/579,532, filed on May 26, 2000.

*Primary Examiner*—Weilun Lo
*Assistant Examiner*—Steven B. Theriault
(74) *Attorney, Agent, or Firm*—Fitzpatrick, Cella, Harper & Scinto

(57) ABSTRACT

A communication apparatus of the present invention has a function of displaying a plurality of video images on a same screen. The communication apparatus includes a first synthesizing unit with synthesizing video data transmitted from a remote communication terminal and video data on a local communication terminal so that a video image on the remote communication terminal and a video image on the local communication terminal are displayed on the same screen in accordance with display layout information common to the remote communication terminal to the local communication terminal that is determined based on a display video image number on the remote communication terminal and a display video image number on the local communication terminal, and a display unit which displays video images corresponding to the synthesized video data obtained by the first synthesizing unit.

10 Claims, 23 Drawing Sheets

U.S. PATENT DOCUMENTS

| | | | | |
|---|---|---|---|---|
| 5,745,161 A * | 4/1998 | Ito | | 348/14.09 |
| 5,757,418 A * | 5/1998 | Inagaki | | 348/14.07 |
| 5,764,277 A * | 6/1998 | Loui et al. | | 348/14.01 |
| 5,793,366 A * | 8/1998 | Mano et al. | | 715/839 |
| 5,805,118 A * | 9/1998 | Mishra et al. | | 345/1.1 |
| 5,825,432 A * | 10/1998 | Yonezawa | | 348/563 |
| 5,838,336 A * | 11/1998 | Ross | | 345/536 |
| 5,854,898 A * | 12/1998 | Riddle | | 709/231 |
| 5,867,209 A * | 2/1999 | Irie et al. | | 348/14.15 |
| 5,887,147 A * | 3/1999 | Arai et al. | | 710/106 |
| 5,900,868 A * | 5/1999 | Duhault et al. | | 725/42 |
| 5,917,543 A * | 6/1999 | Uehara | | 348/211.9 |
| 5,956,081 A * | 9/1999 | Katz et al. | | 348/163 |
| 5,956,094 A * | 9/1999 | Chun | | 348/564 |
| 6,003,093 A * | 12/1999 | Kester | | 719/321 |
| RE36,509 E * | 1/2000 | Shigihara | | 348/564 |
| 6,028,585 A * | 2/2000 | Ishii et al. | | 345/581 |
| 6,057,888 A * | 5/2000 | Bril | | 348/553 |
| 6,091,771 A * | 7/2000 | Seeley et al. | | 375/240 |
| 6,118,493 A * | 9/2000 | Duhault et al. | | 348/564 |
| 6,137,490 A * | 10/2000 | Shishido | | 345/690 |
| 6,160,544 A * | 12/2000 | Hayashi et al. | | 715/716 |
| 6,166,772 A * | 12/2000 | Voltz et al. | | 348/448 |
| 6,208,376 B1 * | 3/2001 | Tanaka et al. | | 348/153 |
| 6,209,025 B1 * | 3/2001 | Bellamy | | 709/217 |
| 6,215,515 B1 * | 4/2001 | Voois et al. | | 348/14.01 |
| 6,247,090 B1 * | 6/2001 | Arai et al. | | 710/9 |
| 6,262,713 B1 * | 7/2001 | Brusky et al. | | 345/158 |
| 6,275,852 B1 * | 8/2001 | Filepp et al. | | 709/220 |
| 6,297,785 B1 * | 10/2001 | Sommer et al. | | 345/1.1 |
| 6,313,853 B1 * | 11/2001 | Lamontagne et al. | | 715/762 |
| 6,332,139 B1 * | 12/2001 | Kaneko et al. | | 707/6 |
| 6,335,722 B1 * | 1/2002 | Tani et al. | | 345/173 |
| 6,380,972 B1 * | 4/2002 | Suga et al. | | 348/211.99 |
| 6,421,069 B1 * | 7/2002 | Ludtke et al. | | 715/762 |
| 6,441,841 B1 * | 8/2002 | Tanoi | | 348/14.07 |
| 6,456,334 B1 * | 9/2002 | Duhault | | 348/565 |
| 6,469,746 B1 * | 10/2002 | Maida | | 348/564 |
| 6,496,860 B2 * | 12/2002 | Ludtke et al. | | 709/223 |
| 6,504,577 B1 * | 1/2003 | Voltz et al. | | 348/448 |
| 6,535,240 B2 * | 3/2003 | Yang et al. | | 348/14.08 |
| 6,538,703 B1 * | 3/2003 | Maeda et al. | | 348/725 |
| 6,630,913 B2 * | 10/2003 | Lee | | 345/1.1 |
| 6,646,647 B1 * | 11/2003 | Surgutchik et al. | | 345/581 |
| 6,667,992 B1 * | 12/2003 | Yanagawa | | 370/490 |
| 6,696,945 B1 * | 2/2004 | Venetianer et al. | | 340/541 |
| 6,710,753 B2 * | 3/2004 | Gillespie et al. | | 345/2.1 |
| 6,714,172 B2 | 3/2004 | Matsuzaki et al. | | 345/1.1 |
| 6,714,238 B2 * | 3/2004 | Urisaka et al. | | 348/211.99 |
| 6,754,178 B1 * | 6/2004 | Sasaki | | 370/235 |
| 6,771,278 B2 * | 8/2004 | Shigeta | | 345/634 |
| 6,816,129 B1 * | 11/2004 | Zimmerman | | 345/1.1 |
| 6,833,874 B2 * | 12/2004 | Ozaki et al. | | 348/565 |
| 6,911,999 B2 * | 6/2005 | Sasaki | | 348/211.6 |
| 6,915,347 B2 * | 7/2005 | Hanko et al. | | 709/227 |
| 6,941,575 B2 * | 9/2005 | Allen | | 725/105 |
| 6,943,845 B2 * | 9/2005 | Mizutome et al. | | 348/555 |
| 7,003,795 B2 * | 2/2006 | Allen | | 725/105 |
| 7,006,154 B2 * | 2/2006 | Dudkowski | | 348/588 |
| 7,031,391 B1 * | 4/2006 | Riffee | | 375/240.27 |
| 7,176,957 B2 * | 2/2007 | Ivashin et al. | | 348/14.09 |
| 2001/0040532 A1 * | 11/2001 | Yasuda | | 345/1.1 |
| 2002/0051083 A1 | 5/2002 | Aratani et al. | | 348/554 |
| 2002/0067376 A1 * | 6/2002 | Martin et al. | | 345/810 |
| 2002/0191071 A1 * | 12/2002 | Rui et al. | | 348/14.03 |
| 2004/0189623 A1 * | 9/2004 | Dunn et al. | | 345/204 |
| 2004/0227739 A1 * | 11/2004 | Tani et al. | | 345/173 |
| 2005/0255912 A1 * | 11/2005 | Love et al. | | 463/30 |

\* cited by examiner

FIG. 27

| cts | ctype | subunit _type | subunit _ID | opcode | oprand (0) |
|---|---|---|---|---|---|
| oprand (1) | | oprand (2) | | oprand (3) | oprand (4) |
| . . . . | | . . . . | | . . . . | . . . . |
| . . . . | | . . . . | | . . . . | . . . . |
| oprand (n) | | "0" padding (if necessary) | | | |

FIG. 28

| cts | response | subunit _type | subunit _ID | opcode | oprand (0) |
|---|---|---|---|---|---|
| oprand (1) | | oprand (2) | | oprand (3) | oprand (4) |
| . . . . | | . . . . | | . . . . | . . . . |
| . . . . | | . . . . | | . . . . | . . . . |
| oprand (n) | | "0" padding (if necessary) | | | |

FIG. 29

| OPCODE | VALUE | MEANS |
|---|---|---|
| CHANNEL USAGE | 12h | SEARCH OF UNIT USING IEEE1394 ISOCHRONOUS |
| CONNECT | 24h | ESTABLISHMENT OF UNSPECIFIED STREAM CONNECTION BETWEEN ISOCHRONOUS PLUG AND SUB-UNIT |
| CONNECT AV | 20h | CONNECTION OF AUDIO/VIDEO BETWEEN ISOCHRONOUS PLUG AND SUB-UNIT |
| CONNECTIONS | 22h | REQUEST OF REPORT OF CONNECTION STATUS |
| DIGITAL INPUT | 11h | |
| DIGITAL OUTPUT | 10h | SETTING OF BROADCAST INPUT/OUTPUT PLUG |
| DISCONNECT | 25h | DISCONNECTION OF UNSPECIFIED STREAM CONNECTION BETWEEN ISOCHRONOUS PLUG AND SUB-UNIT |
| DISCONNECT AV | 21h | DISCONNECTION OF AUDIO/VIDEO BETWEEN ISOCHRONOUS PLUG AND SUB-UNIT |
| INPUT PLUG SIGNAL FORMAT | 19h | SETTING AND SEARCH OF SIGNAL FORMAT OF INPUT/OUTPUT ISOCHRONOUS PLUG |
| OUTPUT PLUG SIGNAL FORMAT | 18h | |
| ASYNCHRONOUS CONNECTION | 26h | ASYNCHRONOUS CONNECTION |
| SUBUNIT INFO | 31h | REPORT OF SUB-UNIT INFORMATION |
| UNIT INFO | 30h | REPORT OF UNIT INFORMATION |

FIG. 30

| OPCODE | VALUE | MEANS |
|---|---|---|
| LOAD MEDIUM | C1h | OPEN, CLOSE, EJECT TAPE |
| RECORD | C2h | SET MECHANICAL UNIT INTO RECORDING MODE |
| PLAY | C3h | SET MECHANICAL UNIT INTO REPRODUCTION MODE |
| WIND | C4h | OPERATE MECHANICAL UNIT NOT IN CASE OF REPRODUCTION OR RECORDING |

FIG. 31

| SUBFUNCTION | VALUE | ACTION |
|---|---|---|
| HIGH SPEED REWIND | 45h | QUICK REWIND |
| STOP | 60h | STOP OF OPERATION |
| REWIND | 65h | REWIND |
| FAST FORWARD | 75h | QUICK WIND-UP |
| RESERVED | OTHERS | — |

COMMUNICATION APPARATUS, COMMUNICATION SYSTEM, VIDEO IMAGE DISPLAY CONTROL METHOD, STORAGE MEDIUM AND PROGRAM

BACKGROUND OF THE INVENTION

1. Field of the Invention

The present invention relates to a communication apparatus, a communication system, a video image display control method, which are utilized for, e.g., a TV phone, a TV conference system and so on, a program for carrying out this display control method, and a computer-readable storage medium storing the program.

2. Description of the Related Art

In recent years, there has been actualized a high speed digital communication technology capable of transferring in a multiplexing manner data requiring a real-time characteristic such as moving image data, audio data etc, and data requiring a reliability of transfer such as still image data, control data etc. Further, a demand for connecting, to one single intra-home network, consumer audio/visual devices and consumer electric appliances that have hitherto been operated alone or through the devices' or appliances' own connections, has increased and been actualized by utilizing the high speed digital communication technology described above.

Further, in the field of TV phones, there is increasingly a demand for displaying, to a party on the line, a video image obtained by a video cassette recorder (VCR), a digital camera etc. which are connected to the intra-home network.

The conventional TV phone, however, has such a problem that there is a lack of consistency in terms of a display mode at the party on the line in the case of transferring, for instance, the VCR image and the digital camera image so that these images can be displayed simultaneously at the party side, and the party on the line is therefore hard to recognize which is the VCR image or the digital camera image and so forth.

Moreover, since transfer of the plurality of video images requires a plurality of communication units, which is a problem in terms of costs.

Further, if possible to watching the video image of the VCR etc of the party on the line, it is expected that there will arise a user's demand for remote-controlling the video image.

SUMMARY OF THE INVENTION

It is a primary object of the present invention, which is devised under such circumstances to obviate the problems described above, to provide a communication apparatus, a communication system, a video image display control method, a storage medium and a program that are capable of facilitating a recognition of a content of display of video images transferred from a communication party.

In order to attain the object, according to an aspect of the present invention, a communication apparatus is presented, which apparatus has a function of displaying a plurality of video image on the same screen, and comprises first synthesizing means for synthesizing video data transmitted from a remote communication party and video data on a local communication party so that a video image on the side of the remote communication party and a video image on the side of the local communication party are displayed on a same screen in accordance with display layout information common to the remote communication party and the local communication party, that is determined based on a number of display video images of the remote communication party and a number of display video images of the local communication party; and display means for displaying video images corresponding to the synthesized video data obtained by said first synthesizing means.

Other objects and features of the present invention will be apparent from the following description in conjunction with the accompanying drawings.

BRIEF DESCRIPTION OF THE DRAWINGS

FIG. 27 is an explanatory diagram showing a format of an AV/C command frame in the 1394 serial bus;

FIG. 28 is an explanatory diagram showing a format of an AV/C response frame in the 1394 serial bus;

FIG. 29 is an explanatory diagram showing commands (example 1) of an AV/C command set in the 1394 serial bus;

FIG. 30 is an explanatory diagram showing the commands (example 2) of the AV/C command set in the 1394 serial bus;

FIG. 31 is an explanatory diagram showing the commands (example 3) of the AV/C command set in the 1394 serial bus;

DETAILED DESCRIPTION OF THE PREFERRED EMBODIMENTS

Embodiments of the present invention will hereinafter be described in depth with reference to the accompanying drawings.

A first embodiment of the present invention will be discussed.

Figure 1:
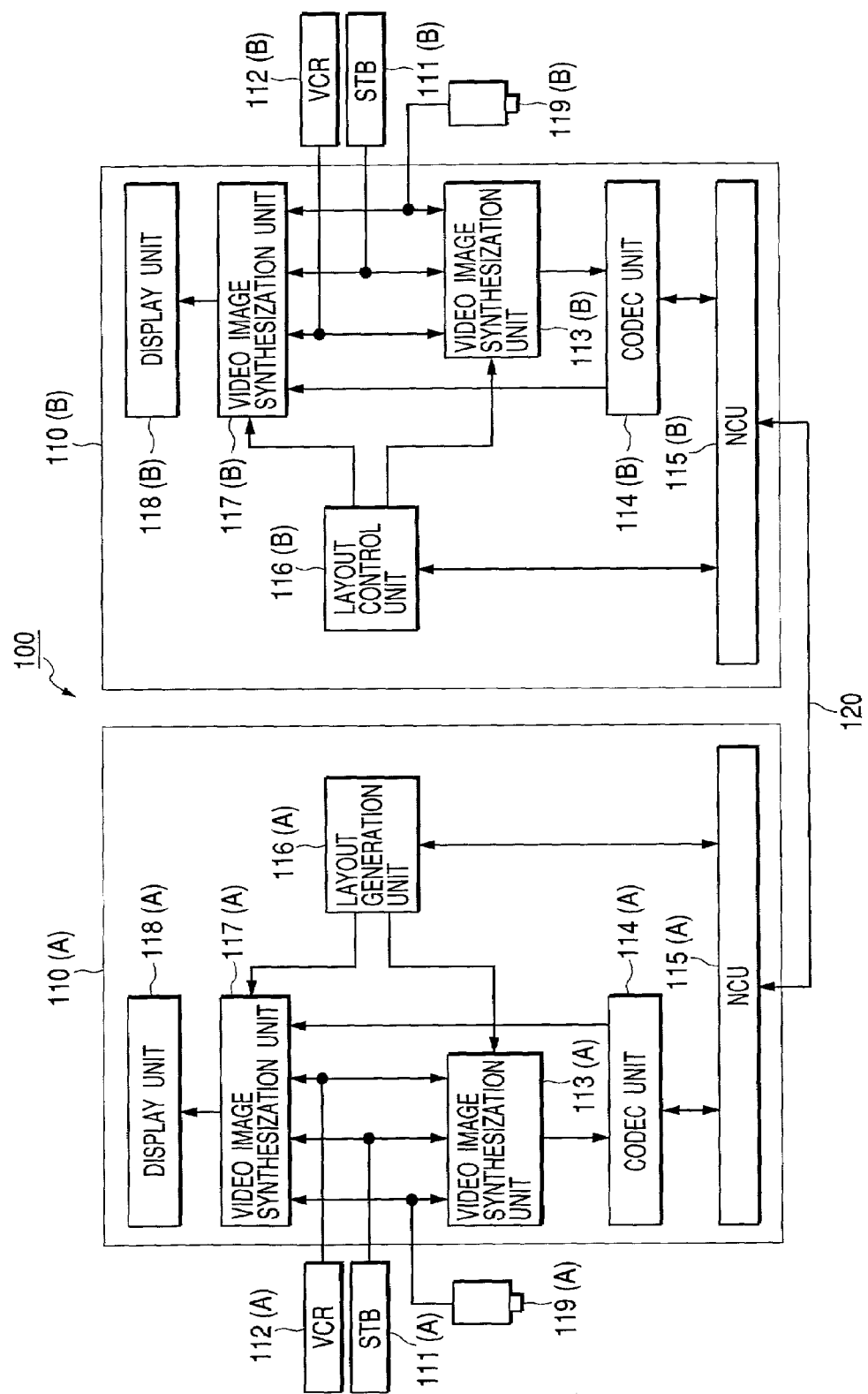
FIG. 1 is a block diagram showing a configuration of a communication system to which the present invention is applied in a first embodiment.

The present invention is applied to, for example, a communication system 100 as shown in FIG. 1. The communication system 100 in the first embodiment has a configuration in which a communication terminal device 110(A) on the side of a user A and a communication terminal device 110(B) on the side of a user B are so connected via a communication line 120 as to be capable of communicating with each other.

Note that FIG. 1 illustrates, for an explanatory simplicity, the configuration including connection between two communication terminal devices 110(A) and 110(B), however, the configuration is not limited to this number of connections.

The communication terminal device 110(A) includes a set-top box (STB) 111(A), a video cassette recorder (VCR) 112(A), a video image synthesization unit 113(A), a CODEC (coder-decoder) unit 114(A), a network control unit (NCU) 115(A), a layout generation unit 116(A), a video image synthesization unit 117(A), a display unit 118(A) and a TV camera 119(A).

The TV camera 119(A) is provided mainly for photographing the user A himself or herself. The STB 111(A) receives broadcasting waves via an unillustrated antenna and outputs a TV program. The VCR 112(A) records and reproduces the TV program etc on and from a recording medium such as a cassette tape and so on.

Note that the STB 111(A) and the VCR 112(A) are herein used as video image sources. However, if capable of outputting the video images, the video image source may also be arbitrary devices such as a laser disk player, a DVD (Digital Versatile or Video Disc) player and so forth. Further, devices such as a digital camera etc that output still images can be used as the STB 111(A) and the VCR 112(A).

The video image synthesization unit 113(A) digitizes the video images transmitted from the TV camera 119(A), the STB 111(A) and the VCR 112(A) and, based on instructions given from the layout generation unit 116(A), executes processes such as enlarging, reducing and synthesizing with respect to the respective video data, thus generating and outputting one video data.

The video image synthesization unit 117(A) generates the video data by digitizing the video images transmitted from the VCR 112(A), the TV camera 119(A), the STB 111(A), the VCR 112(A) and the CODEC unit 114(A) and, based on instructions given from the layout generation unit 116(A), executes processes such as enlarging, reducing and synthesizing with respect to the respective video data, thus generating and outputting one video data.

The CODEC unit 114(A) executes a data compressing/expanding process with respect to the video data and audio data. For instance, the CODEC unit 114(A) compresses a data size (an amount of information) by encoding the video data obtained by the video image synthesization unit 113(A), and outputs the thus compressed video data to the NCU 115(A). Further, the CODEC unit 114(A) expands the data size by decoding the compressed video data supplied from the NCU 115(A).

The NCU 115(A) controls communications of various categories of data with the communication terminal device 110(B) via the communication line 120.

The layout generation unit 116(A) generates and determines a display layout on the basis of the number of the video images displayed on the display unit 118(A) of the communication terminal device 110(A) and the number of the video images displayed on the display unit 118(B) of the communication terminal device 110(B). The layout generation unit 116(A) controls, based on this display layout, the video image synthesization units 113(A) and 117(A). The communication terminal device 110(B) notifies the communication terminal device 110(A) of the number of the video images displayed on the display unit 118(B) of the communication terminal device 110(B) via the communication line 120. Further, the layout generation unit 116(A) notifies the communication terminal device 110(B) of information on the above display layout via the communication line 120.

The display unit 118(A) display-outputs the video images obtained by the video image synthesization unit 117(A) to the user A.

On the other hand, the communication terminal device 110(B)includes a set-top box (STB) 111(B), a video cassette recorder (VCR) 112(B), a video image synthesization unit 113(B), a CODEC (coder-decoder) unit 114(B), a network control unit (NCU) 115(B), a layout generation unit 116(B), a video image synthesization unit 117(B), a display unit 118(B) and a TV camera 119(B). The communication terminal device 110(B) has same configuration as that of the communication terminal device 110(A), however, is different in the following point.

The layout control unit 116(B) notifies the communication terminal device 110(A) of the number of the video images displayed on the display unit 118(B) of the communication terminal device 110(B) via the communication line 120. Further, the layout control unit 116(B) receives display layout information of which the communication terminal device 110(A) notifies via the communication line 120, and controls based on this item of display layout information, the video image synthesization units 113(B) and 117(B).

The NCUs 115(A), 115(B) and the communication lines 120 for the communications between the communication terminal devices 110(A) and 110(B) are those suited to, e.g., ISDN (Integrated Services Digital Network) and are, based on ITU (International Telecommunication Union) Recommendation H.320 etc, so structured as to be capable of transferring the compressed video data obtained by the CODEC units 114(A), 114(B), the number of the video image displayed on the display units 118(A), 118(B) and the display layout information thereof.

An operation of the communication system 100 described above will hereinafter be explained.

Given herein by way of one example is the assumption that the communication terminal device 110(A) is to display three video images obtained by the TV camera 119(A), the STB 111(A) and the VCR 112(A), while the communication terminal device 110(B) is to display two video images obtained by the TV camera 119(B) and the VCR 112(B).

To start with, upon establishing a connection between the communication terminal devices 110(A) and 110(B) via the communication line 120, in the communication terminal device 110(B), the layout control unit 116(B) notifies the communication terminal device 110(A) of the number of the video images, i.e., "2" that are to be displayed on the display unit 118(B).

In the communication terminal device 110(A), the layout control unit 116(A) generates and determines a display layout on the basis of a total number "5" of the number of the video images "2" of which the communication terminal device 110(B) has notified and the number of the video images, i.e., "3" that are to be displayed on the display unit 118(A).

Figure 2:
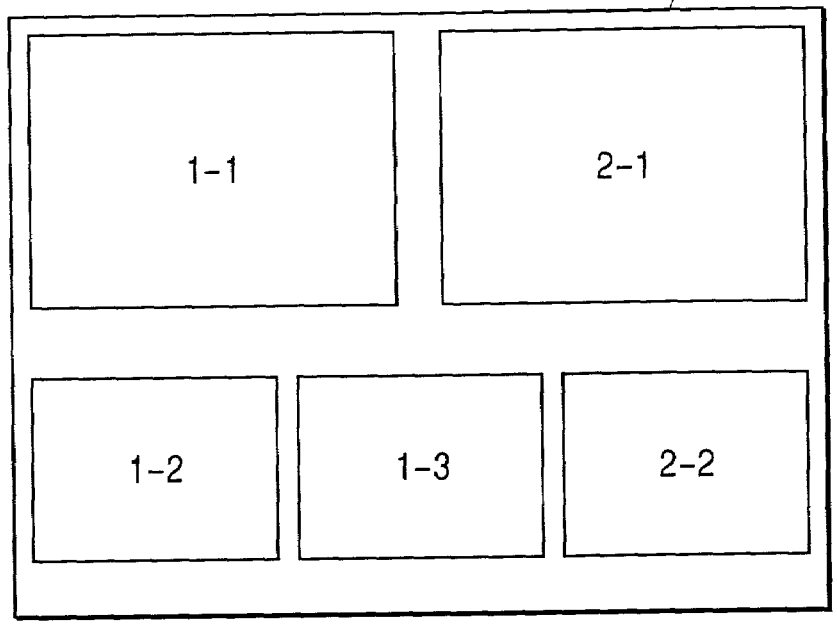
FIG. 2 is an explanatory diagram showing one example of a display layout in the communication system.

FIG. 2 depicts one example of a display layout 201 obtained by the layout generation unit 116(A). The display layout 201 contains five display areas 1-1 through 1-3, 2-1 and 2-2. The display area 1-1 is an area for displaying a video image from the TV camera 119(A) of the communication terminal device 110(A). The display area 1-2 is an area for displaying a video image from the STB 111(A) of the communication terminal device 110(A). The display area 1-3 is an area for displaying a video image from the VCR 112(A) of the communication terminal device 110(A). Further, the display areas 2-1, 2-2 are areas for displaying video images obtained in the communication terminal device 110(B).

Figure 3:
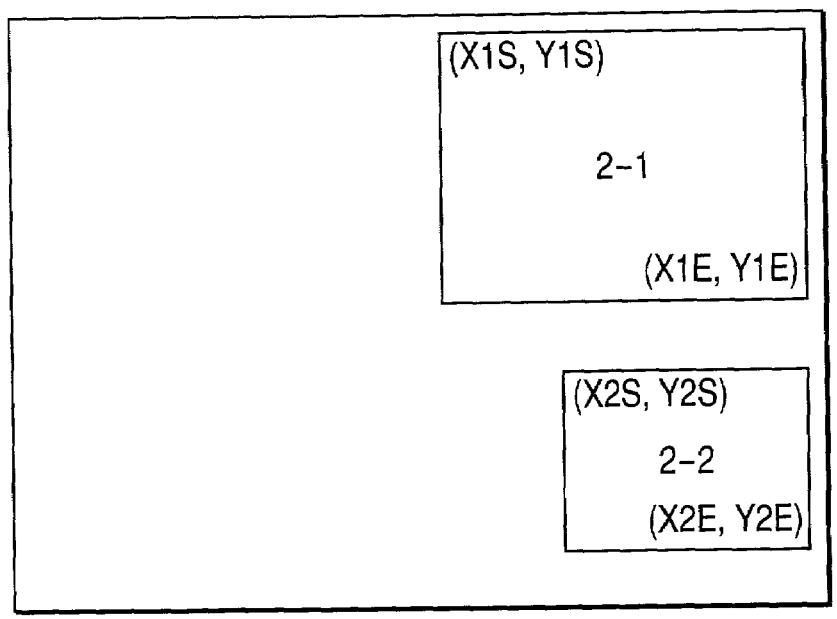
FIG. 3 is an explanatory diagram showing display areas on the receiving side of display layout information with respect to the display layout.

In the case of the display layout in FIG. 2, the layout generation unit 116(A) notifies the communication terminal device 110(B) of what is related to the communication terminal device 110(B), i.e., the information indicating the display areas 2-1, 2-2 as display layout information. The following is one example of the display layout information in this case:
1: X1S, Y1S, X1E, Y1E
2: X2S, Y2S, X2E, Y2E In the display layout information given above, for instance, as depicted in FIG. 3, "X1S" and "Y1S" represent coordinates of the left upper corner of the display area 2-1, and "X1E" and "Y1E" represent coordinates of the right lower corner of the display area 2-1. "X2S" and "Y2S" represent coordinates of the left upper corner of the display area 2-2, and "X2E" and "Y2E" represent coordinates of the right lower corner of the display area 2-2.

Figure 4:
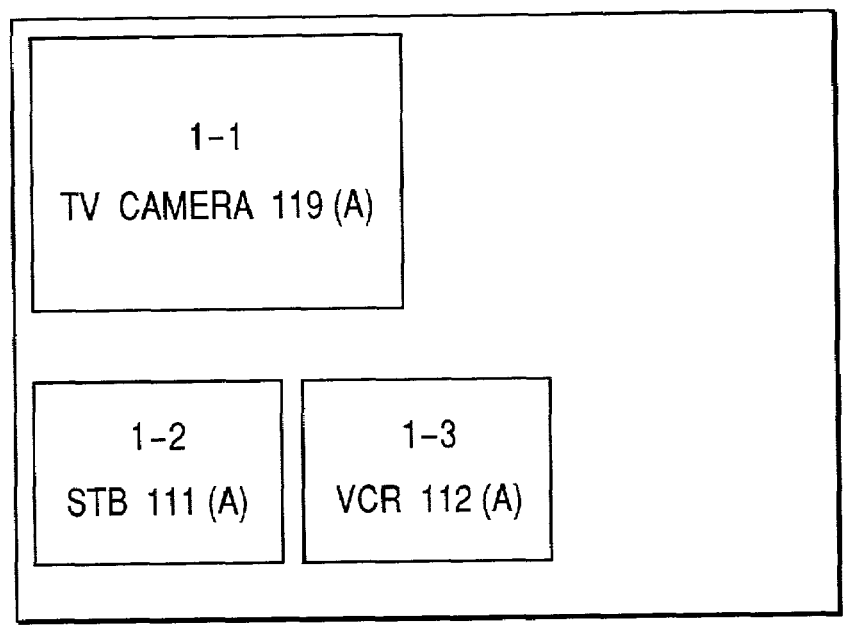
FIG. 4 is an explanatory diagram showing display areas on the transmitting side of display layout information with respect to the display layout.

The layout generation unit 116(A) controls the video image synthesization unit 113(A) on the basis of the display layout as shown in FIG. 2. For example, the layout generation unit 116(A) controls the video image synthesization unit 113(A) so that the video image synthesization unit 113(A) enlarges or reduces the video image obtained by the TV camera 119(A) to change the size of this image to a size of the display area 1-1, then enlarges or reduces the video image obtained by the STB 111(A) to change the size of this image to a size of the display area 1-2, and enlarges or reduces the video image obtained by the VCR 112(A) to change the size of this image to a size of the display area 1-3. Moreover, the layout generation unit 116(A) controls the video image synthesization unit 113(A) so that the video image synthesization unit 113(A) arranges the video image obtained by the TV camera 119(A) in a position of the display area 1-1, then arranges the video image obtained by the STB 111(A) in a position of the display area 1-2, and arranges the video image obtained by the VCR 112(A) in a position of the display area 1-3, and thus generates one synthesized video image. The video image synthesization unit 113(A) operates under the control of the layout generation unit 116(A), thereby generating, as shown in FIG. 4, the video data of the synthesized video images (synthesized video data) of the video images obtained by the TV camera 119(A), the STB 111(A) and the VCR 112(A). Note that the background behind the video data in FIG. 4 may be a background color such as black, gray or blue.

The CODEC unit 114(A) obtains compressed video data by compressing the synthesized video images generated by the video image synthesization unit 113(A), and transfers the compressed video data to the communication terminal device 110(B) via the communication line 120.

In the communication terminal device 110(B), the layout control unit 116(B) controls the vide image synthesization unit 113(B) on the basis of the display layout information (see FIG. 3) transmitted from the communication terminal device 110(A).

Figure 5:
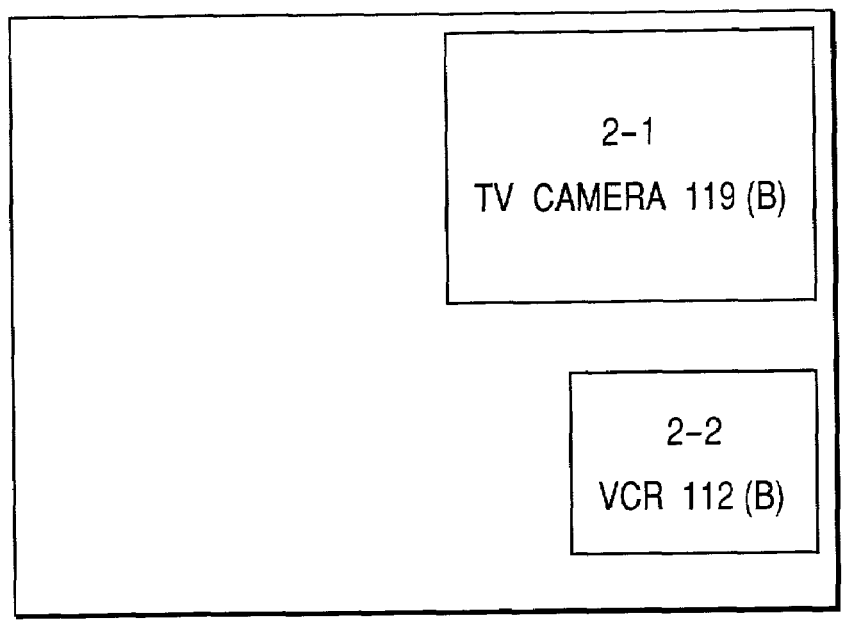
FIG. 5 is an explanatory diagram showing video images in the display areas on the receiving side.

For instance, the layout control unit 116(B) assigns the display area 2-1 specified by the display layout information as an area in which the video image obtained by the TV camera 119(B) is displayed, and assigns the display area 2-2 specified by the display layout information as an area in which the video image obtained by the VCR 112(B) is displayed. Then, the layout control unit 116(B) controls the video image synthesization unit 113(B) so that the video image synthesization unit 113(B) enlarges or reduces the video image obtained by the TV camera 119(B) to change the size of this image to a size of the display area 2-1, and enlarges or reduces the video image obtained by the VCR 112(B) to change the size of this image to a size of the display area 2-2, and so that the video image synthesization unit 113(B) arranges the video image obtained by the TV camera 119(B) in a position of the display area 2-1, and arranges the video image obtained by the VCR 112(B) in a position of the display area 2-2. The video image synthesization unit 113(B) operates under the control of the layout generation unit 116(B), thereby generating, as shown in FIG. 5, the video data of the synthesized video images (synthesized video data) of the video images obtained by the TV camera 119(B) and the VCR 112(B). Note that the background behind the video data in FIG. 5 may be a background color such as black, gray or blue.

The CODEC unit 114(B) obtains compressed video data by compressing the synthesized video images generated by the video image synthesization unit 113(B), and transfers the compressed video data to the communication terminal device 110(A) via the communication line 120.

In the communication terminal device 110(A), the CODEC unit 114(A) expands and restores the video data (compressed video data) transferred from the communication terminal device 110(B), into the original video data (see FIG. 5), and supplies the thus restored original video data to the video image synthesization unit 117(A).

The layout generation unit 116(A) controls the video image synthesization unit 117(A) on the basis of the display layout (see FIG. 2) determined as described above. To be specific, the video image synthesization unit 117(A) enlarges or reduces the video image obtained by the TV camera 119(A) to change the size of this image to a size of the display area 1-1, then enlarges or reduces the video image obtained by the STB 111(A) to change the size of this image to a size of the display area 1-2, and enlarges or reduces the video image obtained by the VCR 112(A) to change the size of this image to a size of the display area 1-3. Moreover, the layout generation unit 116(A) controls the video image synthesization unit 117(A) so that the video image synthesization unit 117(A), with respect to the video images transferred from the communication terminal device 110(B) and restored by the CODEC unit 114(A), arranges the video image obtained by the TV camera 119(A) in a position of the display area 1-1, then arranges the video image obtained by the STB 111(A) in a position of the display area 1-2, and arranges the video image obtained by the VCR 112(A) in a position of the display area 1-3, and thus generates one synthesized video image.

Figure 36:
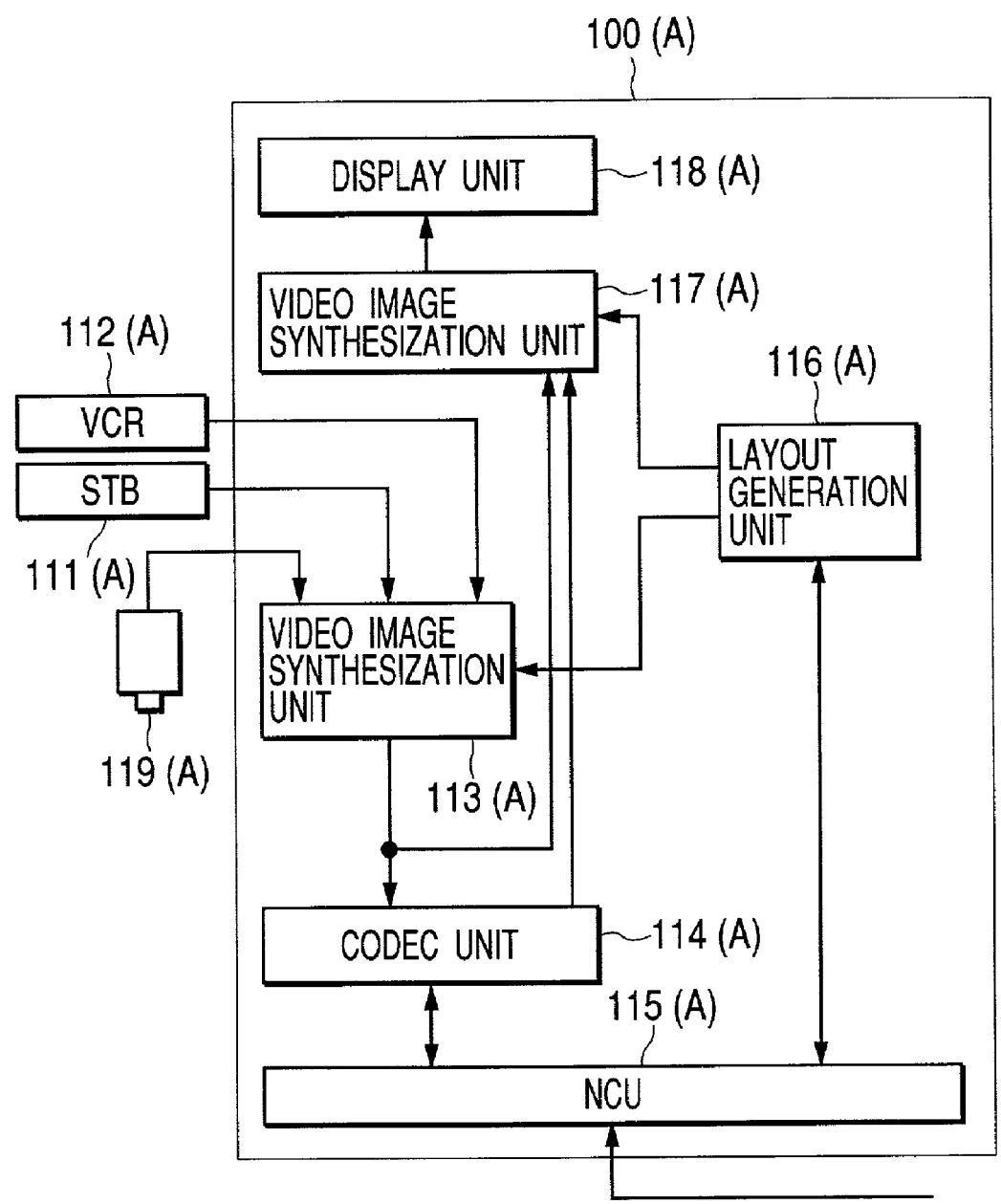
FIG. 36 is a block diagram showing a configuration of the communication system to which the present invention applied otherwise in the first embodiment.

Further, in the case of adopting a configuration as shown in FIG. 36, the same result is obtained even when the layout generation unit 116(A) controls the video image synthesization unit 117(A) so that the video data (see FIG. 4) generated previously by the video image synthesization unit 113(A) are overlapped with the video data obtained by the CODEC unit 114(A), i.e., the video data (see FIG. 5) transferred from the communication terminal device 110(B).

Figure 6:
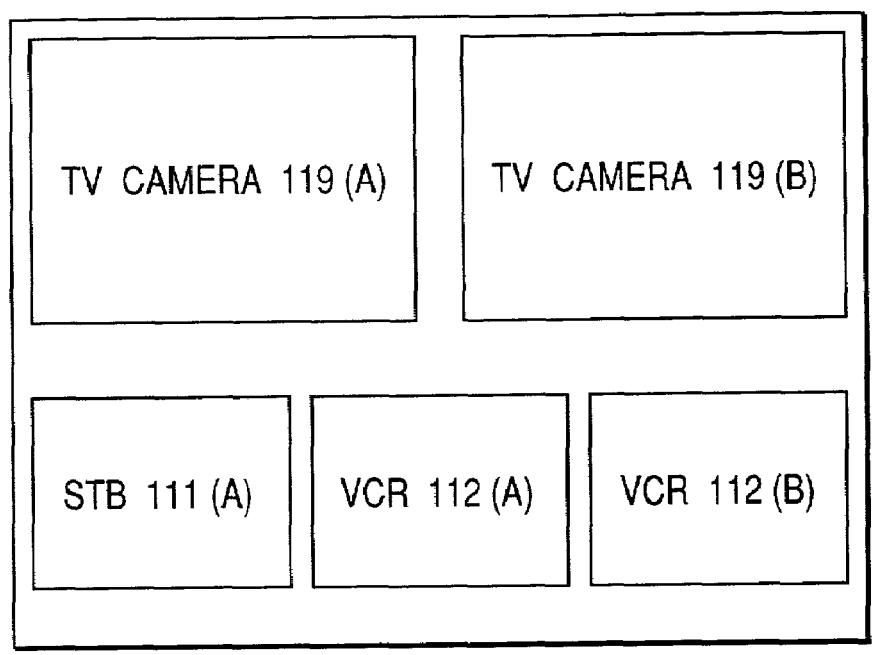
FIG. 6 is an explanatory diagram showing a video image display state based on the display layout information on the receiving and transmitting sides.

The video image synthesization unit 117(A) operates under the control of the layout generation unit 116(A), thereby generating the video data as shown in FIG. 6, i.e., the synthesized video images obtained by synthesizing three video images on the communication terminal device 110(A) with two video images on the communication terminal device 110(B).

The display unit 110(A) displays to the user A on the screen, the video images obtained by the video image synthesization unit 117(A).

In one communication terminal device 110(B) also, the CODEC unit 114(B) expands and restores the video data (compressed video data) transferred from the communication terminal device 110(A) into the original video data (see FIG. 4), and supplies the thus restored original video data to the video image synthesization unit 117(B).

The layout control unit 116(B) controls the video image synthesization unit 117(B) on the basis of the display layout information (see FIG. 3) of which the communication terminal device 110(A) notify as described above. To be specific, the layout control unit 116(B) controls the video image synthesization unit 117(B) so that the video image synthesization unit 117(B) enlarges or reduces the video image obtained by the TV camera 119(B) to change the size of this image to a size of the display area 2-1, and enlarges or reduces the video image obtained by the VCR 112(B) to change the size of this image to a size of the display area 2-2, and, with respect to the video images (see FIG. 4) transferred from the communication terminal device 110(A) and restored by the CODEC unit 114(B), arranges the video image obtained by the TV camera 119(B) in a position of the display area 2-1, and arranges the video image obtained by the VCR 112(B) in a position of the display area 2-2, and thus generates one synthesized video image.

The video image synthesization unit 117(B) operates under the control of the layout control unit 116(B), thereby the video data as shown in FIG. 6, i.e., the same synthesized video image as the synthesized video image obtained on the communication terminal device 110(A).

The display unit 110(B) displays to the user B on the screen, the video images obtained by the video image synthesization unit 117(B).

Those operations being performed as described above, the synthesized video image of the three video images (the respective images from the TV camera 119(A), the STB 111(A) and the VCR 112(A)) on the communication terminal device 110(A) and the two video images (the respective images from the TV camera 119(B) and the VCR 112(B)) on the communication terminal device 110(B), is display-outputted on the communication terminal devices 110(A) and 110(B).

In this case, for example, if the user B desires to additionally display the video image of the STB 111(B) of the communication terminal device 110(B) by use of an unillustrated remote controller or operation unit etc., the following operation is conducted.

The layout control unit 116(B) of the communication terminal device 110(B) is notified of information (on an event (operation) by the user) on adding the video image of the STB 111(B).

The layout control unit 116(B) notifies the communication terminal device 119(A) of the number of video images that are to be displayed on the display unit 118(B), to be specific, the number of video images "3" containing the addition of the video image of the STB 111(B).

In the communication terminal device 110(A), the layout generation unit 116(A), when recognizing a receipt of the notification of the updated number of the video image "3" from the communication terminal device 110(B), recognizes afresh the number of video images that is to be displayed on the display unit 118(A), i.e., a total number "6" of the number of video images "3" plus the number of video images "3" of which the communication terminal device 110(B) notifies afresh this time, and generates and determines a new display layout.

Figure 7:
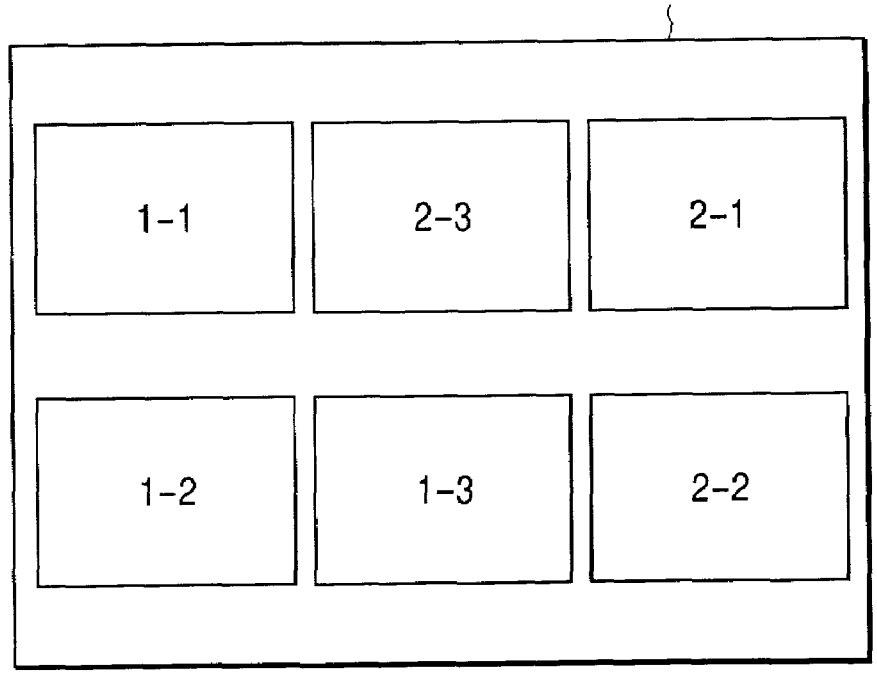
FIG. 7 is an explanatory diagram showing a new display layout upon an adding operation of a video image in the video image display state described above.

FIG. 7 shows one example of a display layout 202 obtained by the layout generation unit 116(A). The display layout 202 contains six display areas 1-1 through 1-3 and 2-1 through 2-3. The display layout 202 has a new addition of the display area 2-3 to the previous display layout 201 (see FIG. 2). This display area 2-3 is an area for displaying the video image of the STB 111(B) of the communication terminal device 110(B).

Accordingly, in the case of the display layout in FIG. 7, the layout generation unit 116(A) notifies the communication terminal device 110(B) of what is related to the communication terminal device 110(B), i.e., the information indicating the display areas 2-1 through 2-3 as display layout information. The following is one example of the display layout information in this case:
1: X1S, Y1S, X1E, Y1E
2: X2S, Y2S, X2E, Y2E
3: X3S, Y3S, X3E, Y3E The layout generation unit 116(A) controls the video image synthesization unit 113(A) on the basis of the new display layout 202 as shown in FIG. 7. Note that the control herein is the same as the control for the display layout 201 as illustrated in FIG. 2, and therefore the detailed explanation thereof is omitted.

Figure 9:
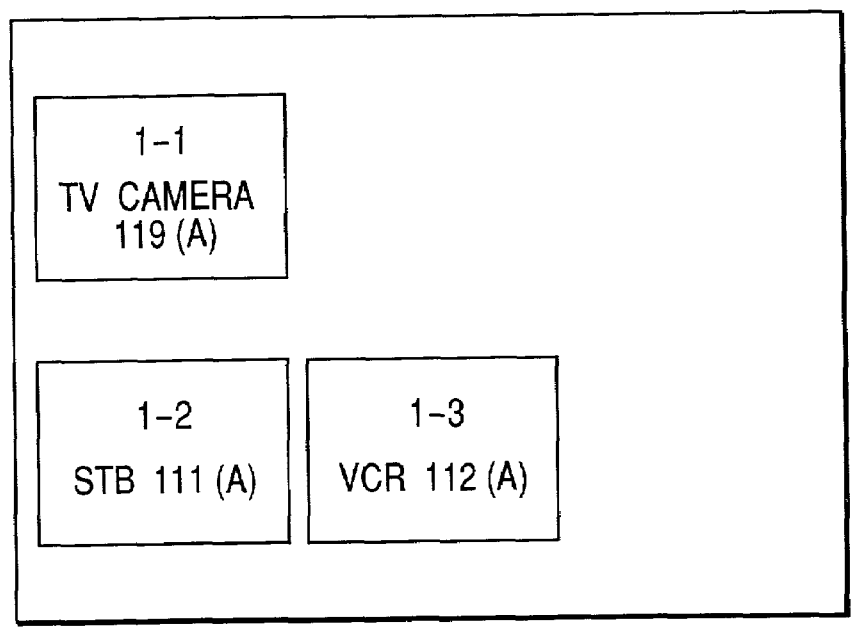
FIG. 9 is an explanatory diagram showing the display areas on the transmitting side of the display layout information with respect to the new display layout.

The video image synthesization unit 113(A) operates under the control of the layout generation unit 116(A), thereby generating, as shown in FIG. 9, the video data of the synthesized video image (synthesized video data) of the video images obtained by the TV camera 119(A), the STB 111(A) and the VCR 112(A). Note that the background behind the video data in FIG. 9 may be a background color such as black, gray or blue.

The CODEC unit 114(A) obtains compressed video data by compressing the synthesized video image generated by the video image synthesization unit 113(A), and transfers the compressed video data to the communication terminal device 110(B) via the communication line 120.

Figure 8:
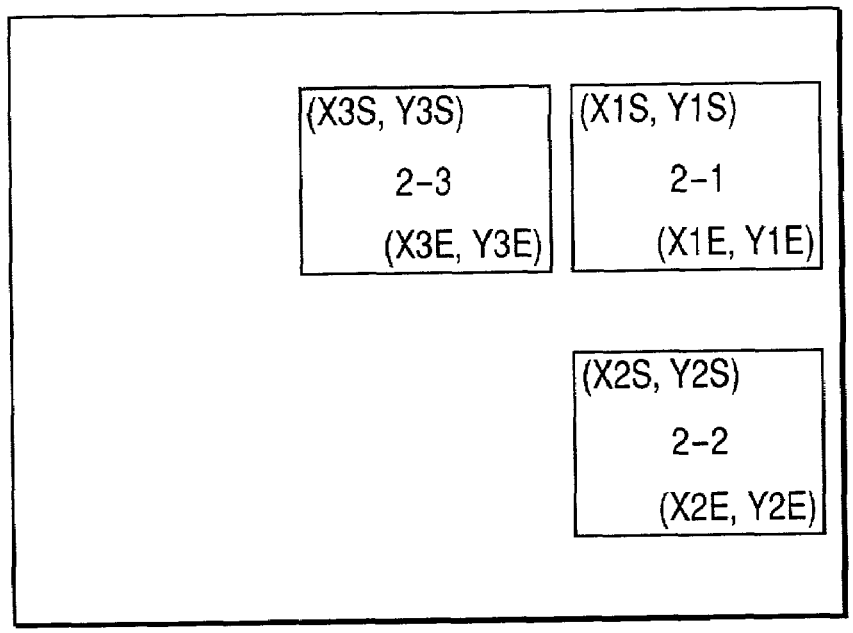
FIG. 8 is an explanatory diagram showing the display areas on the receiving side of the display layout information with respect to the new display layout.

In the communication terminal device 110(B), the layout control unit 116(B) controls the video image synthesization unit 113(B) on the basis of new display layout information (see FIG. 8) transmitted from the communication terminal device 110(A). Note that the control herein is substantially the same as the control in the case of the display layout 201 as shown in FIG. 3 except for an addition of operational control (related to the reduction/enlargement and the disposition of the video image of the STB 111(B)) for the new display area, and hence the detailed explanation thereof is omitted.

Figure 10:
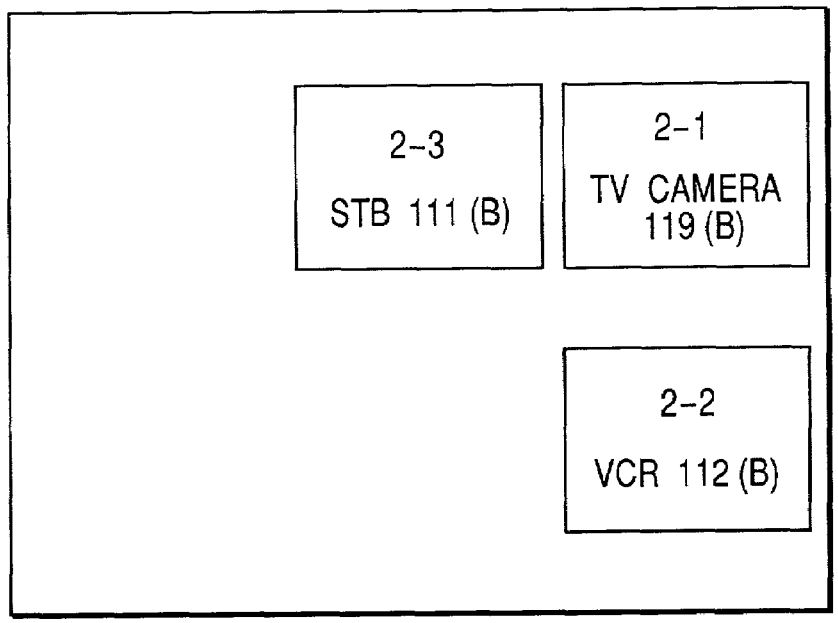
FIG. 10 is an explanatory diagram showing the display areas on the receiving side of the display layout information with respect to the new display layout.

The video image synthesization unit 113(B) operates under the control of the layout generation unit 116(B), thereby generating, as shown in FIG. 10, the video data of the synthesized video image (synthesized video data) of the video images obtained by the TV camera 119(B), the VCR 112(B) and the STB 111(B). Note that the background behind the video data in FIG. 10 may be a background color such as black, gray or blue.

The CODEC unit 114(B) obtains compressed video data by compressing the synthesized video images generated by the video image synthesization unit 113(B), and transfers the compressed video data to the communication terminal device 110(A) via the communication line 120.

Figure 11:
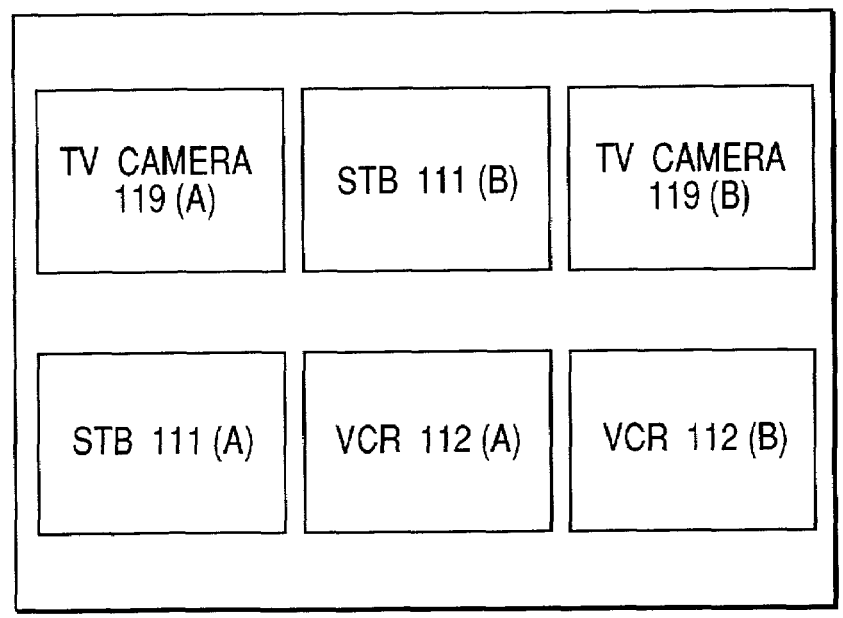
FIG. 11 is an explanatory diagram showing a video image display state based on the new display layout information on the receiving and transmitting sides.

Accordingly, in the communication terminal devices 110(A) and 110(B), as in the case of the display layout 201 in FIG. 2, the synthesized video image (see FIG. 9) of the three video images on the communication terminal device 110(A) and the synthesized video image (see FIG. 10) of the three video images on the communication terminal device 110(B), are synthesized and thus formed into synthesized video image as illustrated in FIG. 11. These synthesized video images are display-outputted to the users A and B, individually.

According to the first embodiment, it is possible to provide the users A and B with the synthesized video image, in the same video display mode including the display layout, of images from the plurality of devices such as the TV camera 119(A), the STB 111(A), VCR 112(A) on the side of the user A and the TV camera 119(B), the STB 111(B), VCR 112(B) on the side of the user B defined as the opposite side to the user A if viewed from the communication line 120. The users A and B are easy to designate, identify and recognize a single image or a plurality of video images out of the synthesized video images.

Further, the communication system 100 needs neither a plurality of communication lines nor a time-division multiplexing means nor a demultiplexing means, and can be therefore actualized at a low cost.

Note that the first embodiment has exemplified the case where the video images on the communication terminal device 110(B) are additionally displayed, however, the present invention is not limited to this. For instance, in the communication terminal device 110(B), as a matter of course, layout change such as reducing the number of video images, changing the display size (window size) and so on can be actualized based on the same configuration and operations.

Moreover, the additional display of the video images on the communication terminal device 110(A) may involve executing the same operations as in the case where the layout generation unit 116(A), after establishing the connection to the communication terminal device 110(B), generates and determines the display layout based on the number of video images of which the communication terminal device 110(B) notifies and the new number of video images that are to be displayed on the communication terminal device 110(A), and thereafter the above video images on the communication terminal device 110(B) are additionally displayed.

Further, according to the first embodiment, in the communication terminal device 110(A), the display layout is determined based on the total sum of the number of video images on the communication terminal device 110(A) and on the communication terminal device 110(B), however, the present invention is not limited to the single communication party (terminal) and may include communications with a plurality of communication terminals and determination of a display layout based on a total sum of the number of video images on the plurality of terminals.

Next, a second embodiment of the present invention will hereinafter be discussed.

Figure 12:
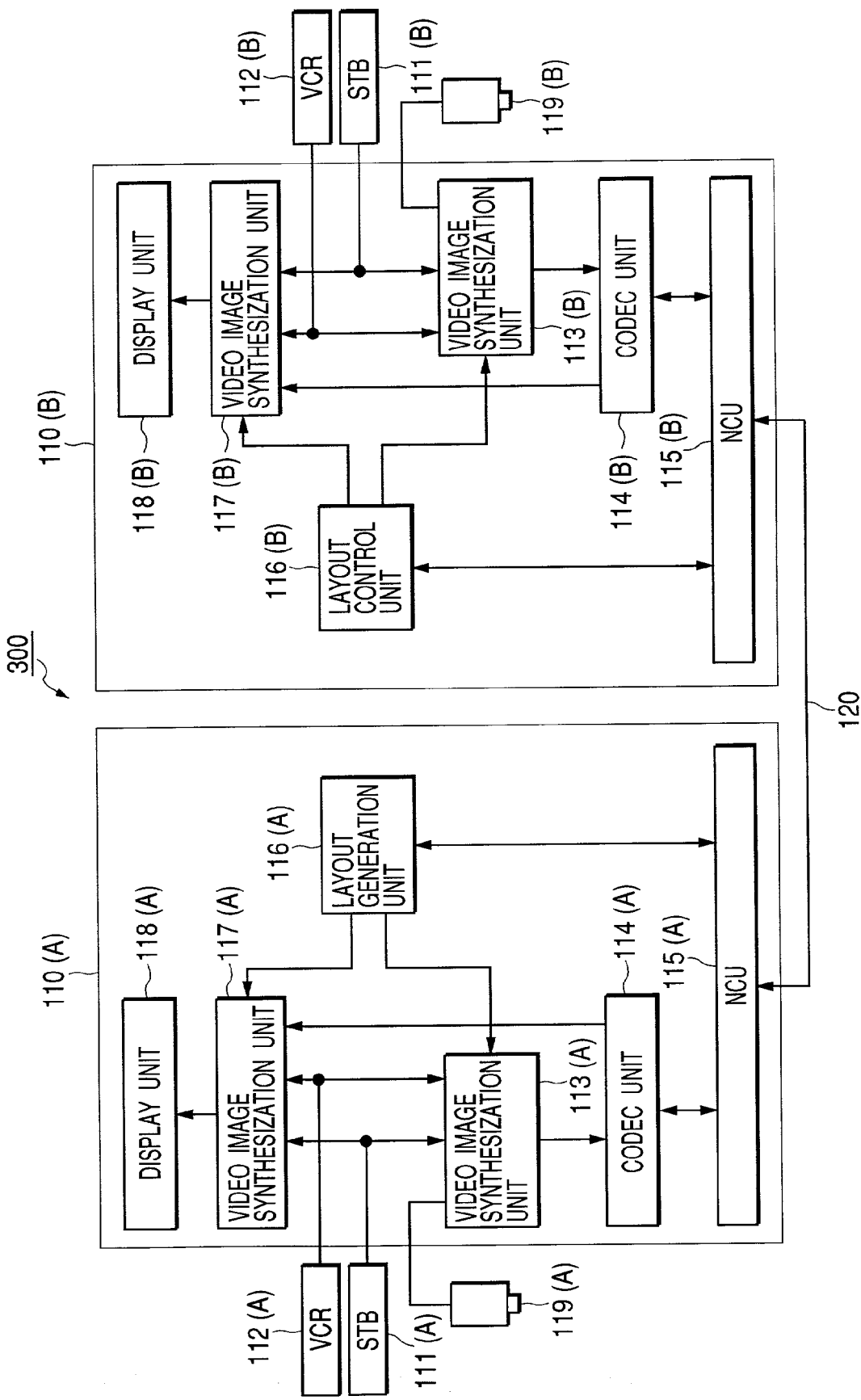
FIG. 12 is a block diagram showing a configuration of a communication system to which the present invention is applied in a second embodiment.

The present invention is applied to, e.g., a communication system 300 as illustrated in FIG. 12. The communication system 300 in the second embodiment, as compared with the configuration in the communication system 100 in FIG. 1, has such a configuration that the TV camera 119(A) of the communication terminal device 110(A) is connected to only the video image synthesization unit 113(A), and the TV camera 119(B) of the communication terminal device 110(B) is similarly connected to only the video image synthesization unit 113(B). This configuration is based on an assumption that when the communication terminal devices 110(A) and 110(B) function as TV phones, only a face of the party on the line is displayed, while the face of the local party is not displayed.

A configuration and operations of the communication system 300 in the second embodiment will hereinafter be specifically explained. Note that the components of the communication system 300 in FIG. 12, which have the same functions as those of the communication system in FIG. 1, are referred to with the same numerals, and their detailed explanations are omitted.

It is here in presumed that the communication terminal device 110(A) displays the video image from the TV camera 119(A) on only the communication terminal device 110(B) for the party on the line and that the two video images from the STB 111(A) and the VCR 112(A) are to be displayed on both of the communication terminal devices 110(A) and 110(B). It is also assumed that the communication terminal device 110(B) likewise displays the video image from the TV camera 119(B) on only the communication terminal device 110(A) for the party on the line and that one video image from the VCR 112(B) is to be displayed on both of the communication terminal devices 110(A) and 110(B).

To begin with, upon establishing the connection between the communication terminal devices 110(A) and 110(B) via the communication line 120, the layout control unit 116(B) in the communication terminal device 110(B) notifies the communication terminal device 110(A) of the number of video images, i.e., "1" that are to be displayed by the communication terminal device 110(B) on both of the communication terminal devices 110(A) and 110(B).

In the communication terminal device 110(A), the layout generation unit 116(A) generates and determines a display layout based on a total number of video images "4" obtained by adding the number of video images "1" of which the communication terminal device 110(B) notifies, the number of video images, i.e., "2" that are to be displayed by the communication terminal device 110(A) on both of the communication terminal devices 110(A) and 110(B), and one video image for displaying the face of the party on the line on the communication terminal devices 110(A) and 110(B).

Figure 13:
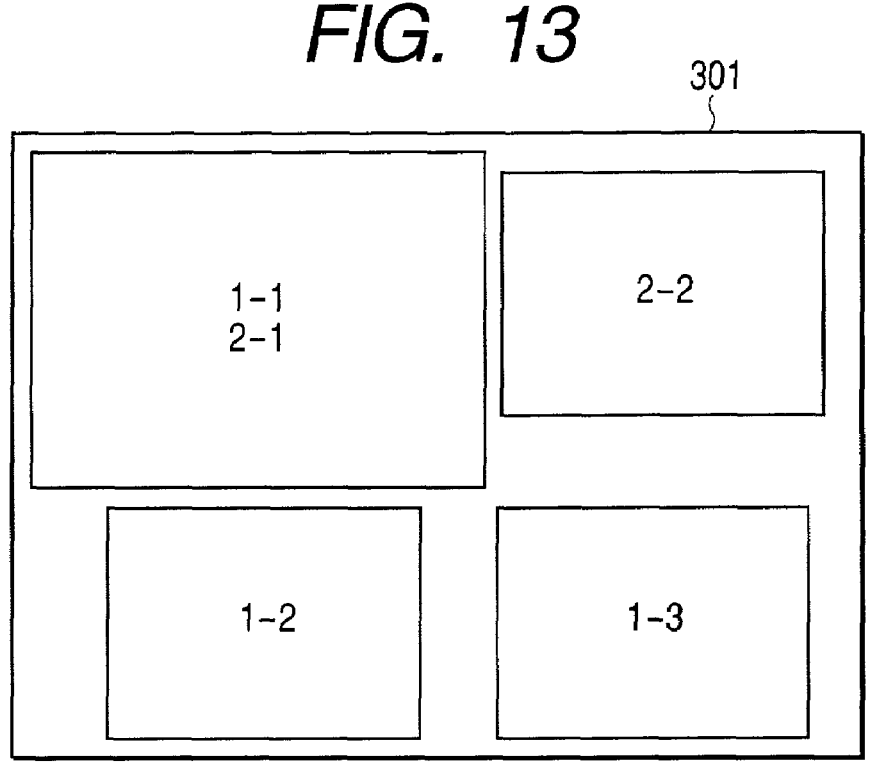
FIG. 13 is an explanatory diagram showing one example of a display layout in the communication system.

FIG. 13 shows one example of a display layout 301 obtained by the layout generation unit 116(A). The display layout 301 contains four display areas 1-1/2-1, 1-2, 1-3 and 2-2. The display area 1-1/2-1 is an area for displaying a video image (by the TV camera 119(A) or 119(B)) of the party on the line. The display area 1-2 is an area for displaying a video image from the STB 111(A) of the communication terminal device 110(A). The display area 1-3 is an area for displaying a video image from the VCR 112(A) of the communication terminal device 110(A). Further, the display area 2-2 is an area for displaying a video image obtained in the communication terminal device 110 (B).

As shown in FIG. 13, particularly the display area 1-1/2-1 has an intentionally overlapping layout for displaying the face of the party on the line on the communication terminal devices 110(A) and 110(B), respectively.

In the case of the display layout in FIG. 13, the layout generation unit 116(A) notifies the communication terminal device 110(B) of what is related to the communication terminal device 110(B), i.e., the information indicating the display areas 2-1, 2-2 as display layout information. The following is one example of the display layout information in this case:

M: XMS, YMS, XME, YME

2: X2S, Y2S, X2E, Y2E

Figure 14:
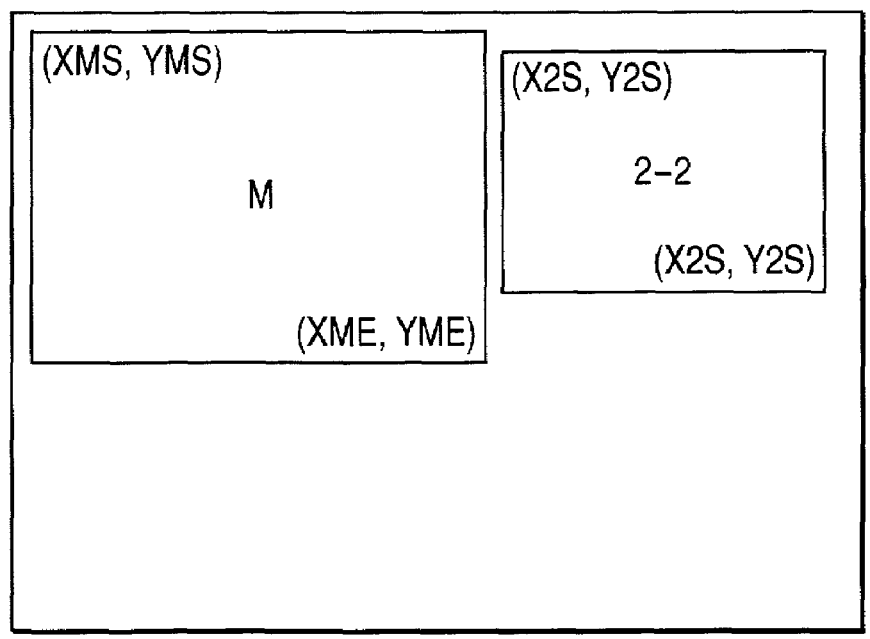
FIG. 14 is an explanatory diagram showing display areas on the receiving side of display layout information with respect to the display layout.

FIG. 14 illustrates images of the display layout information concerned.

Herein, attention should be paid to a point that "M" represents the overlapped display area 1-1/2-1. The communication terminal devices 110(A) and 110(B) judge, though the details will be described later on, that the area designated by "M" needs executing a special process.

Note that the display area 1-1/2-1 may be expressed by use of, e.g., "1" and other numerical values or other characters or character strings etc without being limited to "M".

The layout generation unit 116(A) controls the video image synthesization unit 113(A) on the basis of the display layout 301 as illustrated in FIG. 13.

For instance, the layout generation unit 116(A) controls the video image synthesization unit 113(A) so that the video image synthesization unit 113(A) enlarges or reduces the video image obtained by the TV camera 119(A) to change the size of this video image to a size of the display area 1-1 of which the communication terminal device 110(B) has been notified as the display area "M", then enlarges or reduces the video image obtained by the STB 111(A) to change the size of this video image to a size of the display area 1-2, and enlarges or reduces the video image obtained by the VCR 112(A) to change the size of the video image to a size of the display area 1-3. Further, the layout generation unit 116(A) controls the video image synthesization unit 113(A) so that the video image synthesization unit 113(A) arranges the video image obtained by the TV camera 119(A) in a position of the display area 1-1, then arranges the video image obtained by the STB 111(A) in a position of the display area 1-2, and arranges the video image obtained by the VCR 112(A) in a position of the display area 1-3.

Figure 15:
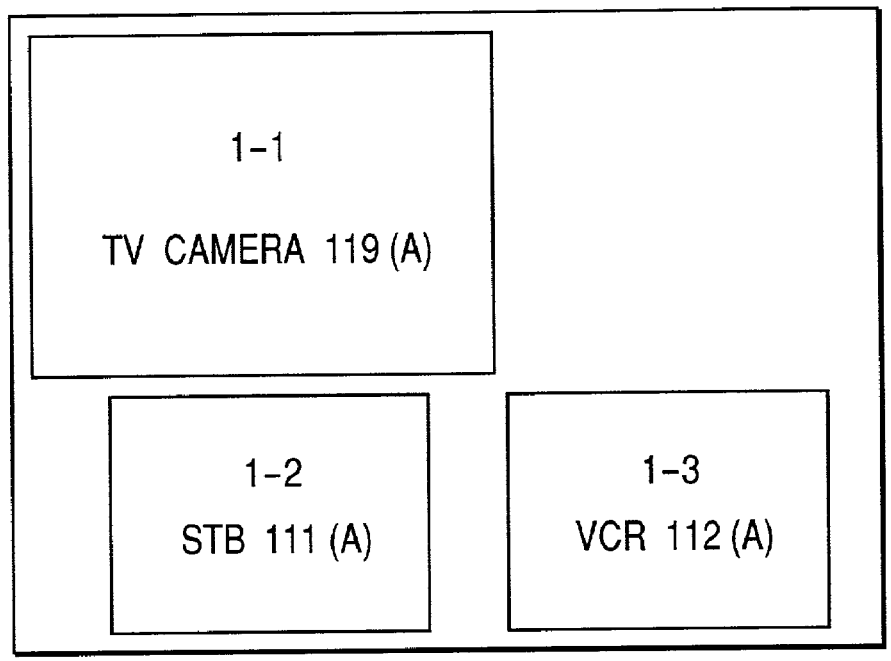
FIG. 15 is an explanatory diagram showing display areas on the transmitting side of display layout information with respect to the display layout.

The video image synthesization unit 113(A) operates under the control of the layout generation unit 116(A), thereby generating, as shown in FIG. 15, the video data of the synthesized video image (synthesized video data) of the video images obtained by the TV camera 119(A), the STB 111(A) and the VCR 112(A).

Note that the background behind the video data in FIG. 15 may be a background color such as black, gray or blue.

The CODEC unit 114(A) obtains compressed video data by compressing the synthesized video image generated by the video image synthesization unit 113(A), and transfers the compressed video data to the communication terminal device 110(B) via the communication line 120.

In the communication terminal device 110(B), the layout control unit 116(B) controls the video image synthesization unit 113(B) on the basis of display layout information (see FIG. 14) transmitted from the communication terminal device 110(A). For instance, the layout control unit 116(B) assigns the display area "M" contained in the display layout information as an area in which the video image obtained by the TV camera 119(B) is displayed, and assigns the remaining display area 2-2 as an area in which the video image obtained by the VCR 112(B) is displayed. Then, the layout control unit 116(B) controls the video image synthesization unit 113(B) so that the video image synthesization unit 113(B) enlarges or reduces the video image obtained by the TV camera 119(B) to change the size of this image to a size of the display area "M", and enlarges or reduces the video image obtained by the VCR 112(B) to change the size of this image to a size of the display area 2-2. Moreover, the layout control unit 116(B) controls the video image synthesization unit 113(B) so that the video image synthesization unit 113(B) arranges the video image obtained by the TV camera 119(B) in a position of the display area "M", and arranges the video image obtained by the VCR 112(B) in a position of the display area 2-2.

Figure 16:
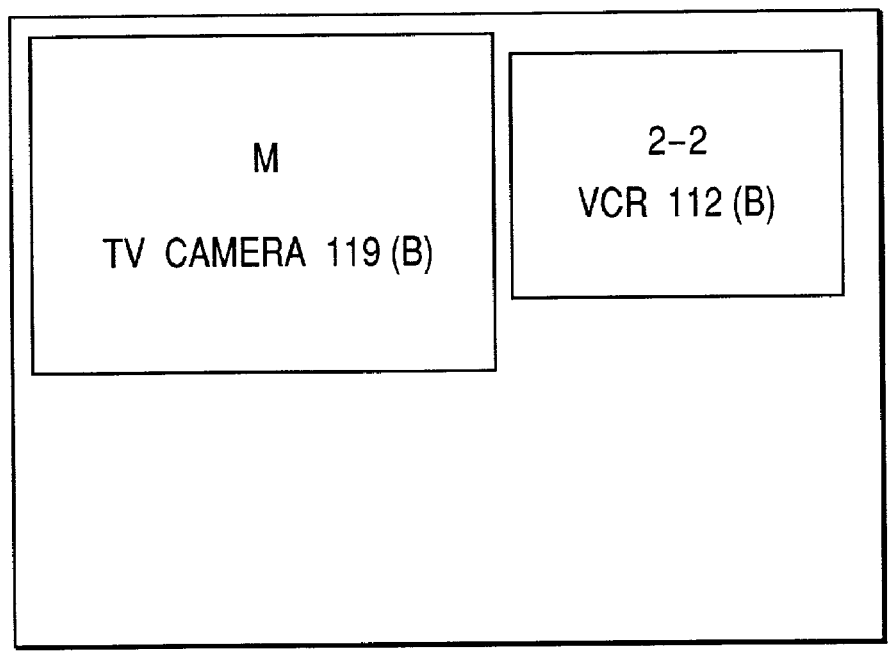
FIG. 16 is an explanatory diagram showing video images in the display areas on the receiving side.

The video image synthesization unit 113(B) operates under the control of the layout generation unit 116(B), thereby generating, as shown in FIG. 16, the video data of the synthesized video image (synthesized video data) of the video images obtained by the TV camera 119(B) and the VCR 112(B).

Note that the background behind the video data in FIG. 16 may be a background color such as black, gray or blue.

The CODEC unit 114(B) obtains compressed video data by compressing the synthesized video image generated by the video image synthesization unit 113(B), and transfers the compressed video data to the communication terminal device 110(A) via the communication line 120.

In the communication terminal device 110(A), the CODEC unit 114(A) expands and restores the video data (compressed video data) transferred from the communication terminal device 110(B), into the original video data (see FIG. 16), and supplies the thus restored original video data to the video image synthesization unit 117(A).

The layout generation unit 116(A) controls the video image synthesization unit 117(A) on the basis of the display layout (see FIG. 13) determined as described above. To be specific, the video image synthesization unit 117(A) enlarges or reduces the video image obtained by the STB 111(A) to change the size of this image to a size of the display area 1-2, and enlarges or reduces the video image obtained by the VCR 112(A) to change the size of this image to a size of the display area 1-3, and controls the video image synthesization unit 117(A) so that the video image synthesization unit 117(A), with respect to the video images transferred from the communication terminal device 110(B) and restored by the CODEC unit 114(A), arranges the video image obtained by the STB 111(A) in a position of the display area 1-2, and arranges the video image obtained by the VCR 112(A) in a position of the display area 1-3, and thus generates one synthesized video image. Herein, attention should be paid to a point that the video image obtained by the TV camera 119(A) is neither enlarged nor reduced nor arranged.

Figure 17:
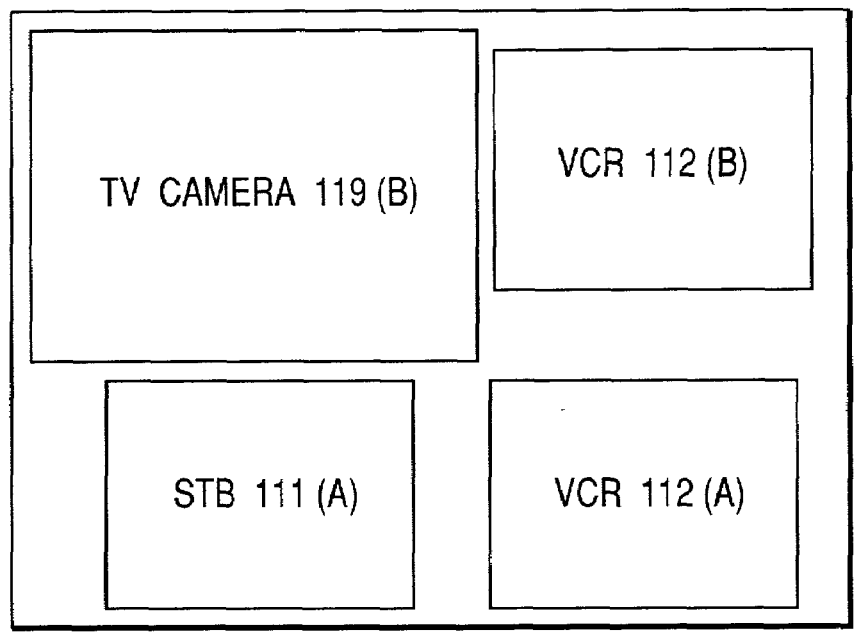
FIG. 17 is an explanatory diagram showing a video image display state based on the display layout information on the receiving side.

The video image synthesization unit 117(A) operates under the control of the layout generation unit 116(A), thereby generating the video data as shown in FIG. 17, i.e., the synthesized video image obtained by synthesizing two video images on the communication terminal device 110(A), one video image on the communication terminal device 110(B) and a video image of the communication party.

The display unit 110(A) displays to the user A on the screen, the video images obtained by the video image synthesization unit 117(A).

In the other communication terminal device 110(B) also, the CODEC unit 114(B) expands and restores the video data (compressed video data) transferred from the communication terminal device 110(A) into the original video data (see FIG. 15), and supplies the thus restored original video data to the video image synthesization unit 117(B).

The layout control unit 116(B) controls the video image synthesization unit 117(B) on the basis of the display layout information (see FIG. 14) of which the communication terminal device 110(A) has notified as described above. To be specific, the layout control unit 116(B) controls the video image synthesization unit 117(B) so that the video image synthesization unit 117(B) enlarges or reduces the video image obtained by the VCR 112(B) to change the size of this image to a size of the display area 2-2, and, with respect to the video images transferred from the communication terminal device 110(A) and restored by the CODEC unit 114(B), arranges the video image obtained by the VCR 112(B) in a position of the display area 2-2, and thus generates one synthesized video image. Herein also, attention should be paid to a point that the video image obtained by the TV camera 119(B) is neither enlarged nor reduced nor arranged.

Figure 18:
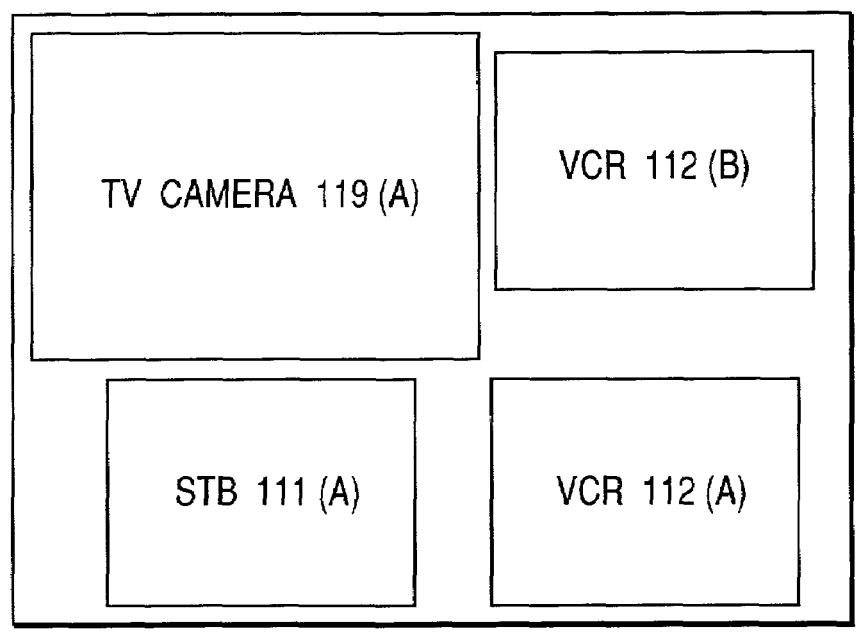
FIG. 18 is an explanatory diagram showing a video image display state based on the display layout information on the transmitting side.

The video image synthesization unit 117(B) operates under the control of the layout generation unit 116(B), thereby generating the video data as shown in FIG. 18, i.e., the synthesized video image obtained by synthesizing two video images on the communication terminal device 110(A), one video image on the communication terminal device 110(B) and a video image of the communication party.

The display unit 110(B) displays to the user B on the screen, the video images obtained by the video image synthesization unit 117(B).

Accordingly, the users A and B are provided with the video images from the STB 111(A) and the VCR 112(A) of the communication terminal device 110(A), the video image by the CVR 112(B) of the communication terminal device 110(B) and the video image of the user A or B defined as the communication party.

Note that the architecture and the operations in the case of adding the video image by the communication terminal device 110(A) or 110(B) or in the case of changing the display layout, are the same as those explained in the first embodiment, and hence their explanations in depth are omitted.

According to the second embodiment, the video image unnecessary for the user A and the video image unnecessary for the user B can be displayed to the user who needs these video images. This scheme results in the effective utilization of the display areas on the display units 118(A) and 118(B). Further, this makes it possible to avoid an increase in reduction rate of the video image when synthesizing the video images and to provide, as a scale-down video image, each image contained in the synthesized video image provided to the user A or B.

A third embodiment of the present invention will hereinafter be described.

Figure 19:
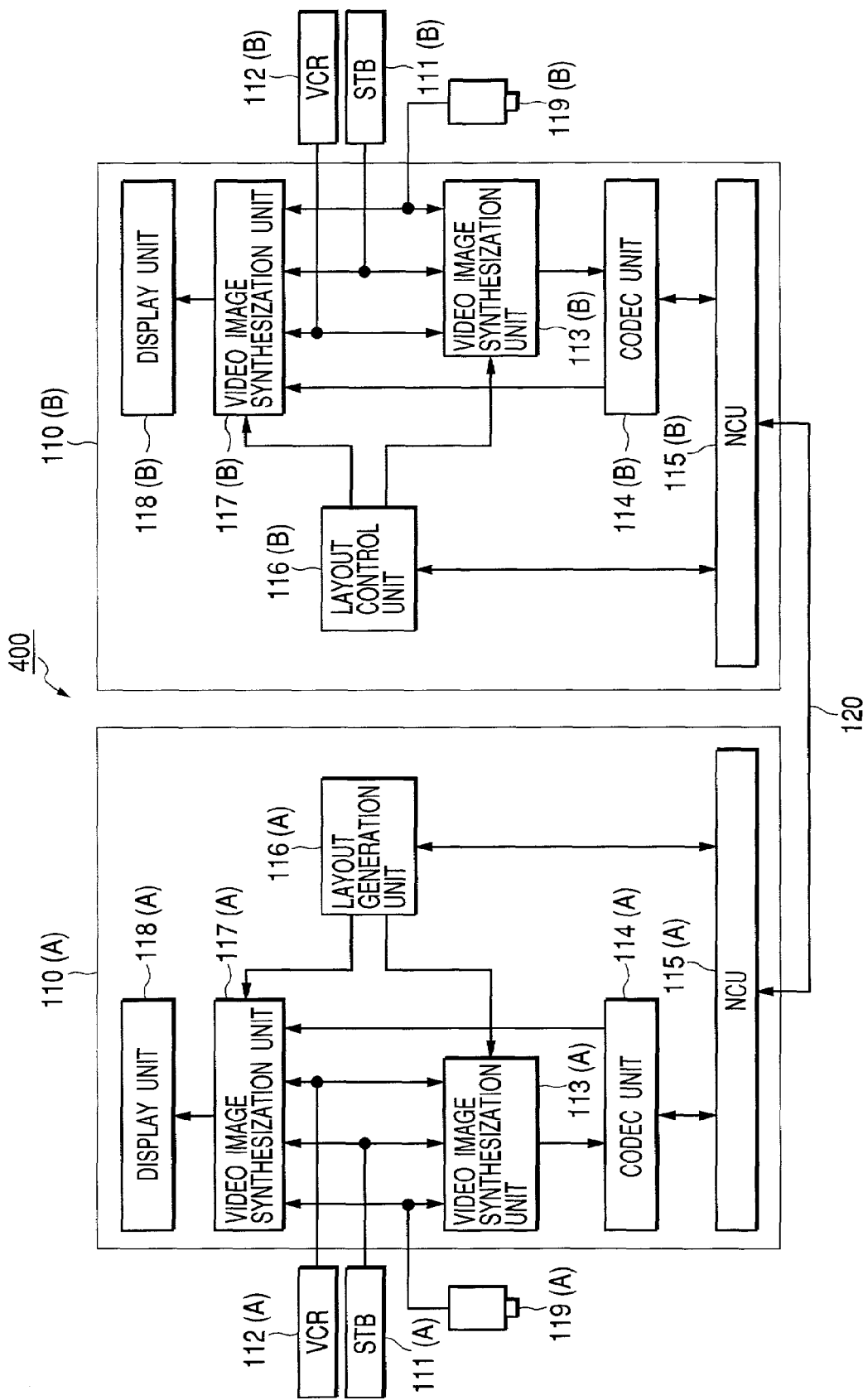
FIG. 19 is a block diagram showing a configuration of a communication system to which the present invention is applied in a third embodiment.

The present invention is applied to, e.g., a communication system 400 as illustrated in FIG. 19. The communication system 400 in the third embodiment, as compared with the architecture in the communication system 100 in FIG. 1, has such a configuration that the communication terminal device 110(B) is provided with a layout generation unit 116(B) functioning the same as the layout generation unit 116(A) does, as a substitute for the layout control unit 116(B).

The architecture and operations of the communication system 400 in the third embodiment will hereinafter be specifically explained. Note that the components of the communication system 400 in FIG. 12, which have the same functions as those of the communication system 100 in FIG. 1, are marked with the same numerals, and their detailed explanations are omitted.

It is herein presumed that the communication terminal device 110(A) displays three video images obtained by the TV camera 119(A), the STB 111(A) and the VCR 112(A), while the communication terminal device 110(B) displays two video images obtained by the TV camera 119(B) and the VCR 112(B).

To start with, upon establishing the connection between the communication terminal devices 110(A) and 110(B) via the communication line 120, the layout control unit 116(B) in the communication terminal device 110(B) notifies the communication terminal device 110(A) of the number of video images, i.e., "2" that are to be displayed on the display unit 118(B).

In the communication terminal device 110(A), the layout generation unit 116(A) generates and determines a display layout based on a total count "5" obtained by adding the number of video images "2" of which the communication terminal device 110(B) notifies, the number of video images, i.e., "3" that are to be displayed on the display unit 118(A).

Note that the configuration given herein by way of one example is that the communication terminal device 110(A)

is set as a transmitting side, while the communication terminal device 110(B) is set as a receiving side, wherein the communication terminal device 110(B) as the receiving side notifies the communication terminal device 110(A) of the number of video images to be displayed, however, as will be obvious from the following discussion, the communication terminal device 110(A) as the receiving side may notify the communication terminal device 110(B) of the number of video images to be displayed. Further, it may be determined in accordance with other negotiations which terminal device notifies the number of video images.

Figure 20:
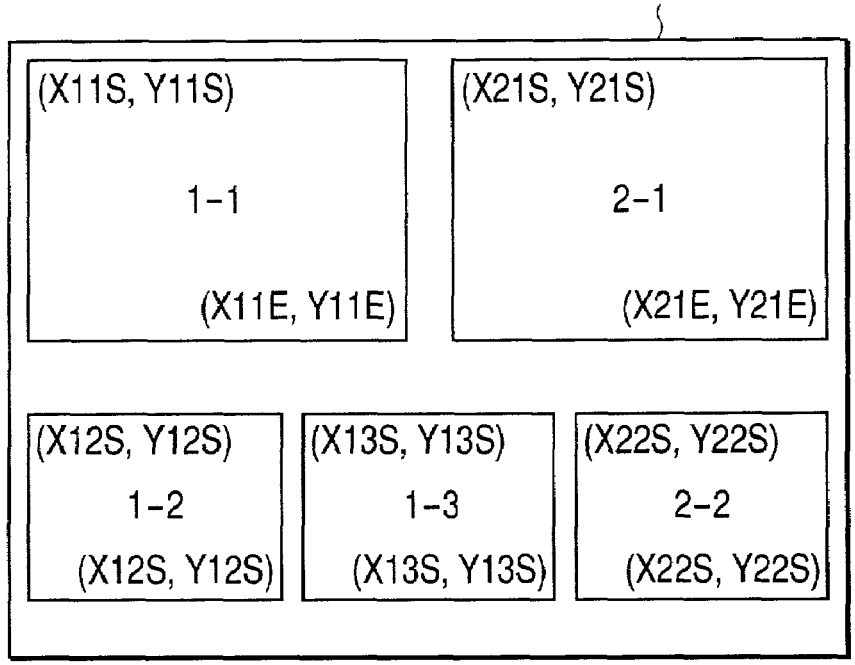
FIG. 20 is an explanatory diagram showing one example of a display layout in the communication system.

FIG. 20 shows one example of a display layout 501 obtained by the layout generation unit 116(A). The display layout 501 contains five display areas 1-1 through 1-3, 2-1, and 2-2. The display area 1-1 is an area for displaying a video image by the TV camera 119(A) of the communication terminal device 110(A). The display area 1-2 is an area for displaying a video image from the STB 111(A) of the communication terminal device 110(A). The display area 1-3 is an area for displaying a video image from the VCR 112(A) of the communication terminal device 110(A). Further, the display areas 2-1, 2-2 are areas for displaying video images obtained in the communication terminal device 110(B).

In the case of the display layout in FIG. 20, the layout generation unit 116(A) notifies the communication terminal device 110(B) of the display layout information concerned. The following is one example of the display layout information in this case:

1-1: X11S, Y11S, X11E, Y11E
1-2: X12S, Y12S, X12E, Y12E
1-3: X13S, Y13S, X13E, Y13E
2-1: X21S, Y21S, X21E, Y21E
2-2: X22S, Y22S, X22E, Y22E

An implication is that the display areas 1-1, 1-2, 1-3 each denoted with notation starting with "1" are defined as areas used by the communication terminal device 110(A) as the transmitter of this item of layout information, and the display areas 2-1, 2-2 each denoted with notation starting with "2" are defined as areas used by the communication terminal device 110(B) as the receiver of this item of layout information.

Hereafter, the layout generation unit 116(A) of the communication terminal device 110(A) operates the same as in the first embodiment, and the layout generation unit 116(B) of the communication terminal device 110(B) operates the same as the layout control unit 116(B) in the first embodiment operates, whereby it follows that the same video images as those shown in FIG. 6 are provided to the users A and B.

In this case, for instance, when the user B desires to additionally display the video image from the STB 111(B) of the communication terminal device 110(B) by use of the unillustrated remote controller or operation unit etc, the following operations are carried out.

The layout generation unit 116(B) of the communication terminal device 110(B) is notified of information (which is event information about the user's operation described above) on adding the video image from the STB 111(B). The layout control unit 116(B) sets a total number of video images to "6" by adding the number of video images that are to be displayed on the display unit 118(B), i.e., the number of video images "3" containing the addition of the video image from the STB 111(B) and the number of video images that are to be displayed by the communication terminal device 110(A) that is obtained from the previously received display layout information, i.e., the number of video images "3", and generates and determines a new display layout.

Figure 21:
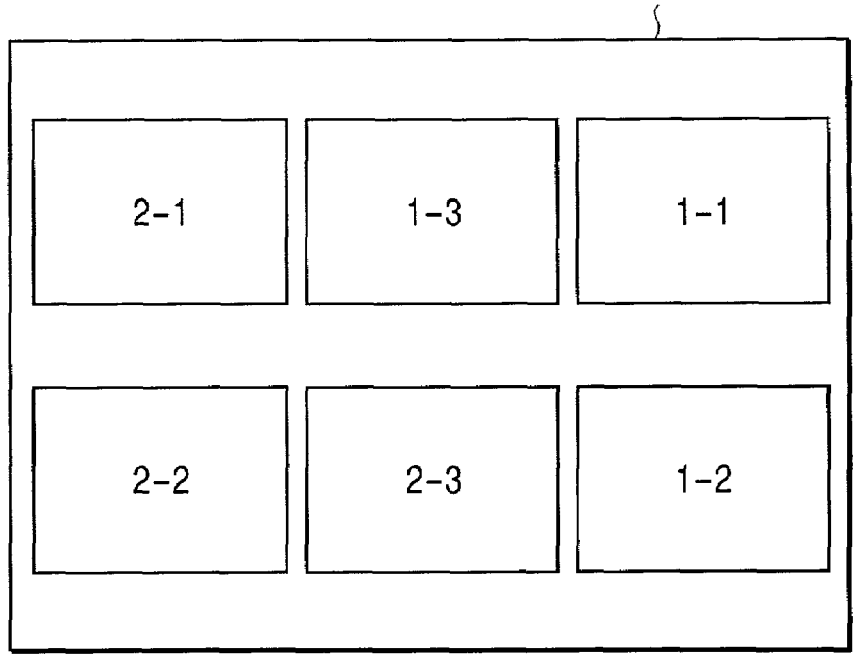
FIG. 21 is an explanatory diagram showing a new display layout upon an adding operation of a video image in the video image display state described above.

FIG. 21 shows one example of a display layout 502 obtained by the layout generation unit 116(B). The display layout 502 contains display areas 1-1 through 1-3 for the communication terminal device 110(B), and display areas 2-1 through 2-3 for the communication terminal device 110(A). An implication is that the display areas 1-1, 1-2, 1-3 each denoted with notation starting with "1" are defined as areas used by the communication terminal device 110(B) as the transmitter of this item of layout information, and the display areas 2-1, 2-2 each denoted with notation starting with "2" are defined as areas used by the communication terminal device 110(A) as the receiver of this item of layout information.

In the case of the display layout in FIG. 21, the layout generation unit 116(B) notifies the communication terminal device 110(A) of the display layout information concerned. The following is one example of the display layout information in this case:

1-1: X11S, Y11S, X11E, Y11E
1-2: X12S, Y12S, X12E, Y12E
1-3: X13S, Y13S, X13E, Y13E
2-1: X21S, Y21S, X21E, Y21E
2-2: X22S, Y22S, X22E, Y22E
2-3: X23S, Y23S, X23E, Y23E

Figure 22:
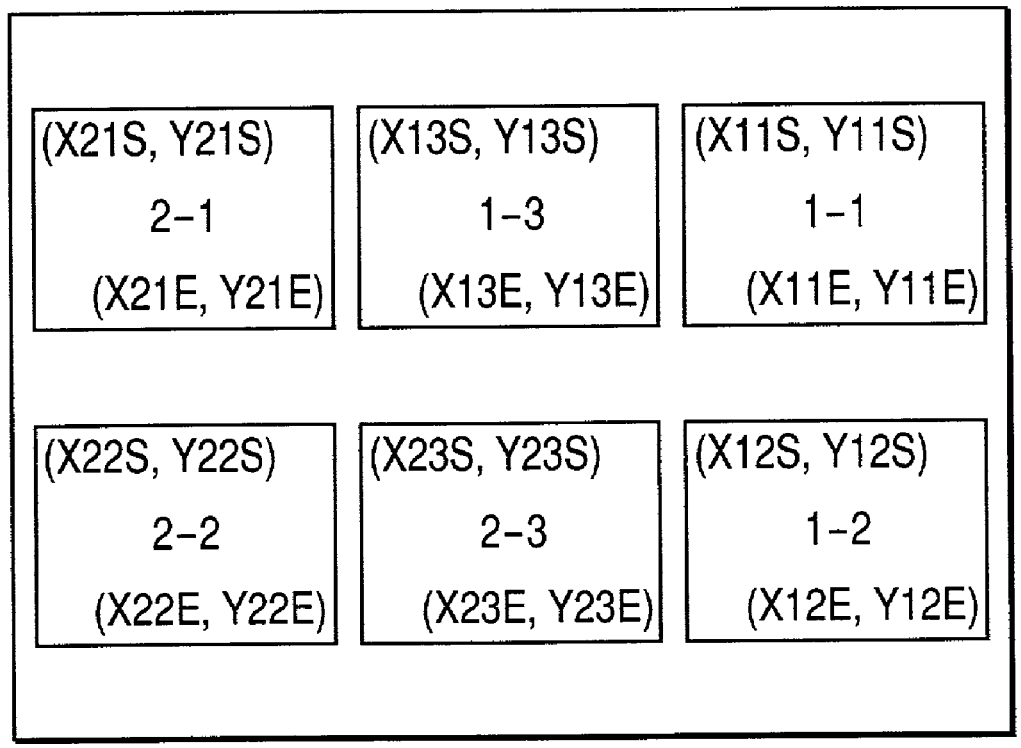
FIG. 22 is an explanatory diagram showing information representing the display layout.

FIG. 22 illustrates images of the display layout information concerned.

Hereafter, the layout generation unit 116(A) of the communication terminal device 110(A) operates the same as in the first embodiment, and the layout generation unit 116(B) of the communication terminal device 110(B) operates the same as the layout control unit 116(B) in the first embodiment operates, whereby it follows that the same video images as those shown in FIG. 11 are provided to the users A and B.

Note that the architecture and operations in the case of additionally displaying the video images in the communication terminal device 110(A) or 110(B) or in the case of changing the display layout, are the same as those explained in the first embodiment, and hence their detailed explanations are omitted.

According to the third embodiment, even when the communication terminal devices 110(A) and 110(B) are configured the same, the same effects as those in the first embodiment are obtained.

A fourth embodiment of the present invention will be discussed.

Figure 23:
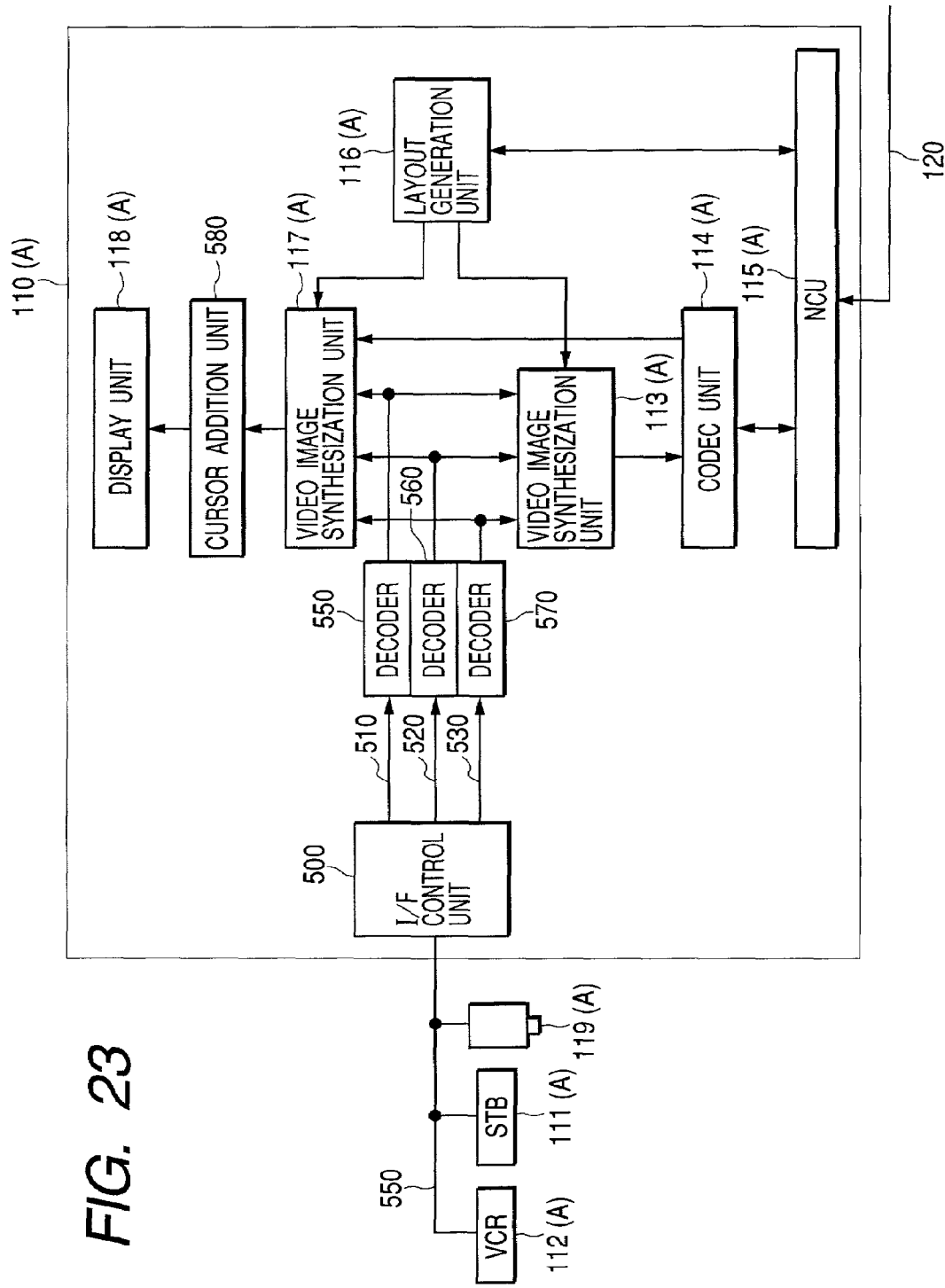
FIG. 23 is a block diagram showing a configuration of a communication terminal device in the communication system to which the present invention is applied in a fourth embodiment.

The fourth embodiment adopts such a configuration that the communication terminal device 110(A) in, for instance, the communication system 400 (see FIG. 19) in the third embodiment, is configured as illustrated in FIG. 23. Note that the discussion to be specifically made herein will be focused on configurations and operations different from the third embodiment.

The communication terminal device 110(A), as shown in FIG. 23, involves an application of a configuration of an interface (which will hereinafter be called also a [1394 serial bus]) pursuant to, e.g., IEEE1394-1995 Standard as an output system of the video camera 119(A), the STB 111(A) and the VCR 112(A).

Therefore, the communication terminal device 110(A) includes a 1394 interface (I/F) control unit 500. This 1394 interface (I/F) control unit 500 is connected via the 1394 serial bus 550 to the video camera 119(A), the STB 111(A) and the VCR 112(A).

A basic function of the 1394 serial bus is herein described. Note that the details of the 1394 serial bus are written in, e.g., "IEEE Standard for a High Performance Serial Bus" issued by the Institute of Electrical and Electronics Engineers, Inc. and so on.

The 1394 serial bus has characteristics such as a connection method exhibiting a high degree of freedom, automatic setting, real-time transfer and so on. Further, the 1394 serial bus has an automatic setting function. The automatic setting function is a function of detecting, when a power supply of a device (which will hereinafter referred to as a [node]) connected to the 1394 serial bus is switched ON/OFF and when a new node is connected, the ON- or OFF-state and such the connection, automatically executing bus resetting, and thereafter automatically recognizing a configuration and allocating Ids to the respective nodes, and so forth.

The data transfer mode is categorized into tow transfer modes such as an asynchronous transfer suitable for transferring control signals like commands etc and file data etc, and an isochronous transfer suitable for a transfer of streaming data having a time-sequential date such as moving image data, audio data etc.

Figure 24:
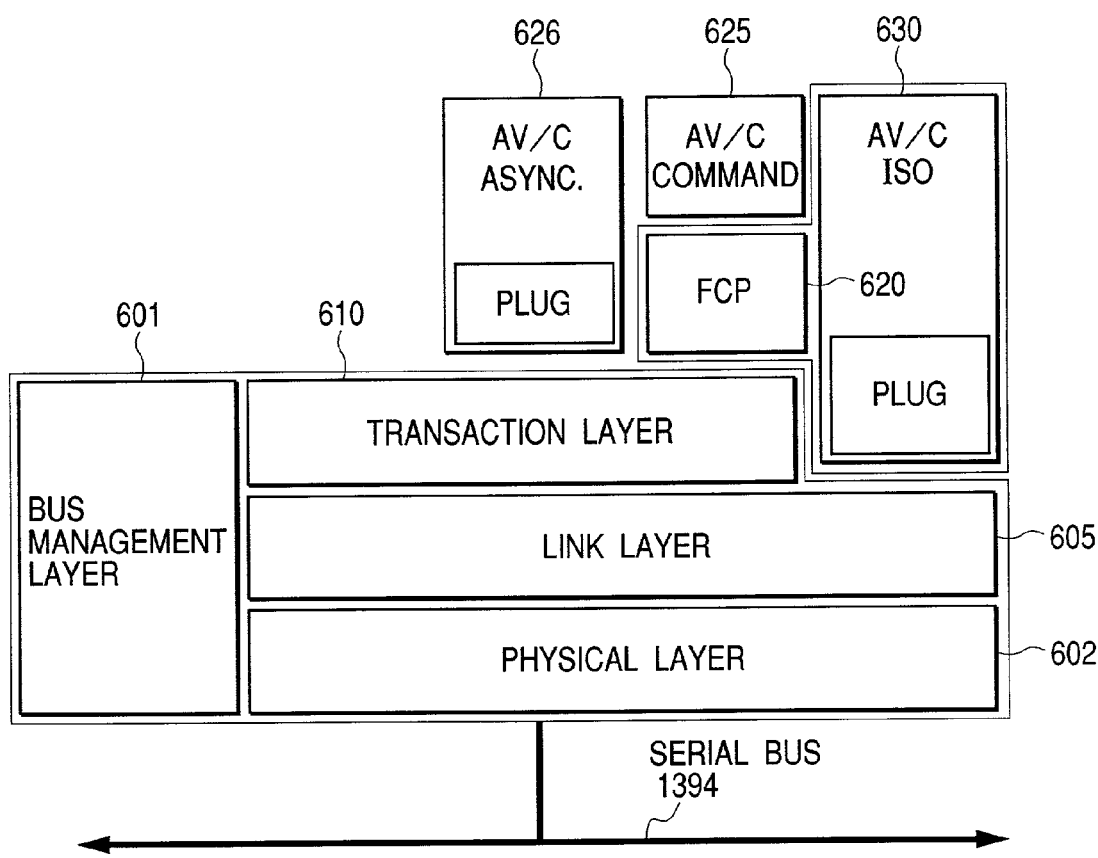
FIG. 24 is an explanatory diagram showing a hierarchical structure of a 1394 serial bus applied in the communication system.

The 1394 serial bus is configured based on a hierarchical structure as shown in, e.g., FIG. 24. In the hierarchical structure shown in FIG. 24, a physical layer 602 governs mechanical/electrical specifications of cables/connectors, coding/decoding of I/O signals, bus initialization, a negotiation for authorizing the user of the bus and so on. A link layer 605 governs providing a service for realizing transmission/receipt of packet data between the physical layer 602 and a transaction layer 610. The transaction layer 610 governs providing a service for realizing asynchronous transfers in three categories such as "read", "write" and "lock" between the link layer 605 and a higher-order layer such as an application layer etc.

On the 1394 serial bus, there exist two types of bus management nodes such as a bus manager and an isochronous resource manager (IRM). These functions may be performed by the same node.

The bus management layer 601 governs node control, an isochronous resource management and a bus management. A function of the node control, which is provided in each of the nodes on the 1394 serial bus, includes a "control status register (CSR)" specified by IEEE1212 standard, and involves managing the asynchronous transfer between the nodes. The isochronous resource management is conducted by only the node defined as the IRM, and involves allocating a channel number and a bandwidth to the node that is to execute the isochronous transfer, and ensuring the channel number and the assured bandwidth used for the isochronous transfer. The bus management is conducted by only the bus manager node, and involves managing configuration information (creating a configuration map), managing bit-rate information (creating a bit-rate map), managing a power supply and so on.

A Function Control Protocol (FCP) 620 governs transmitting and receiving the data under 512 bytes that is known as a command frame and a response frame, by utilizing asynchronous transfer, thereby attaining the inter-node control. The command frame is defined as data to be written into a command register of a controlled node from a control node. The response frame is defined as data to be written, as a response to the command frame, into a response register of the control node from the controlled node.

Figure 25:
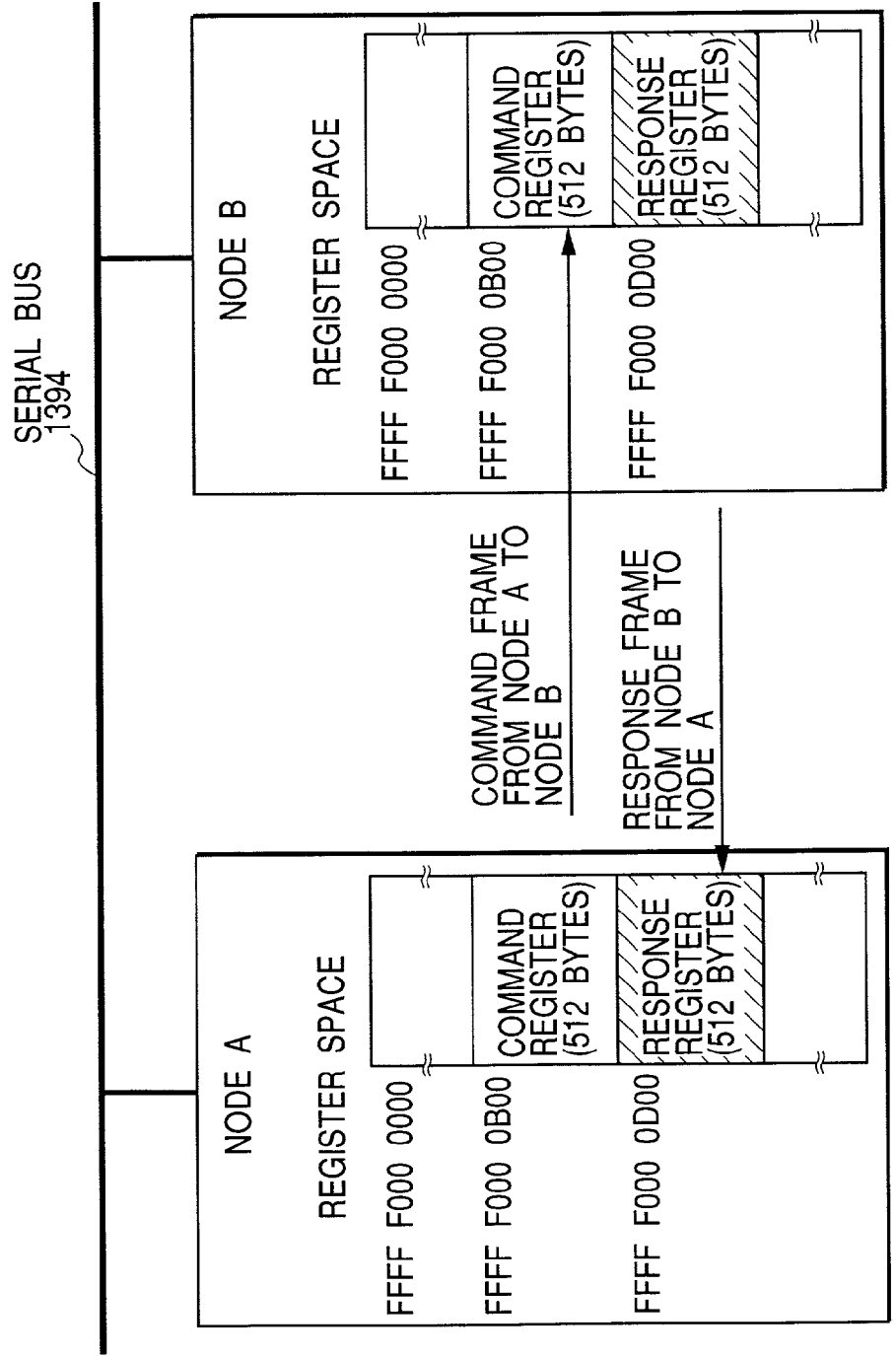
FIG. 25 is an explanatory diagram showing a FCP in the 1394 serial bus.
Figure 26:
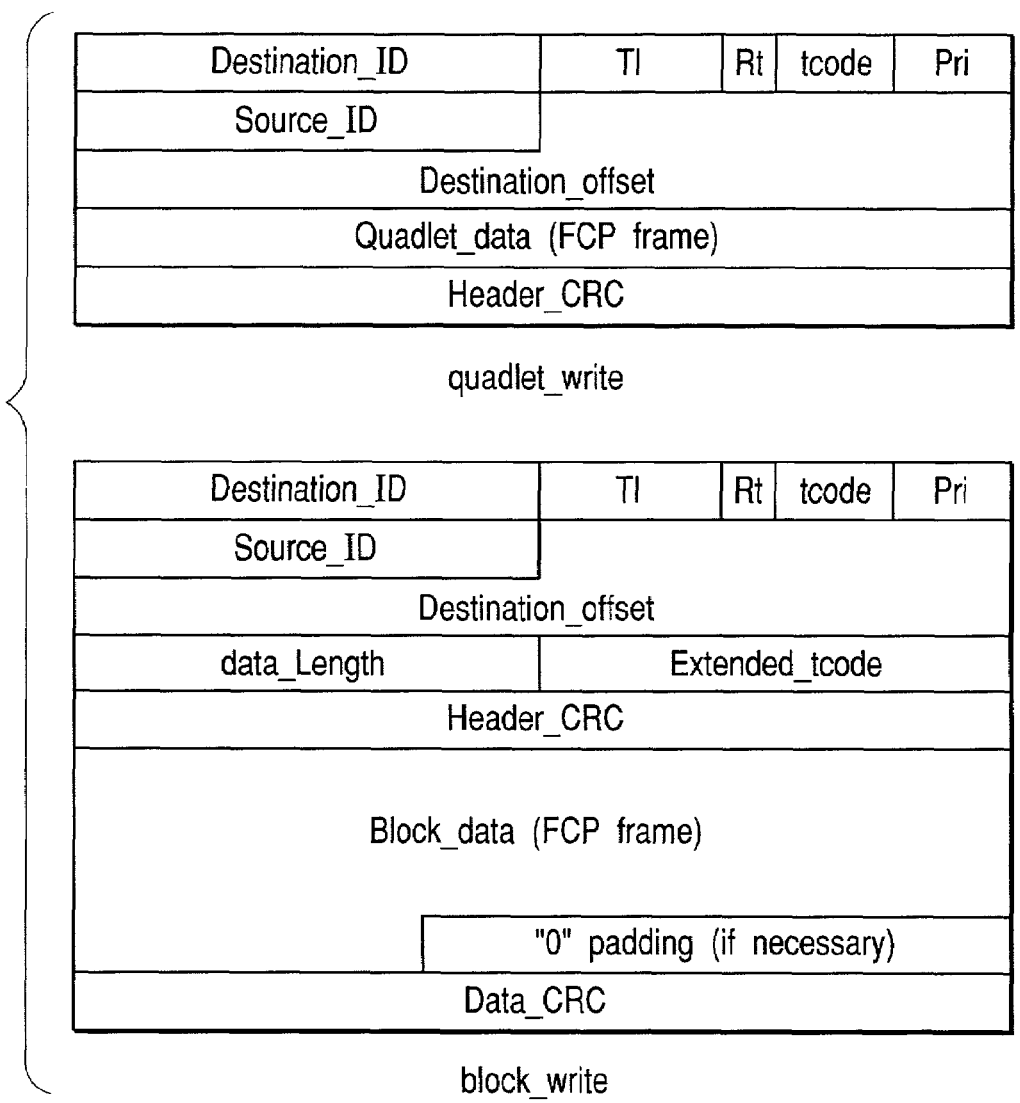
FIG. 26 is an explanatory diagram showing a format of a FCP frame.

FIG. 25 illustrates how the command frame data and the response frame data are transferred and received. FIG. 26 shows a structure of the asynchronous transfer packet used based on the FCP 620. The command frame data or the response frame data is set in a data field of this packet.

An AV/C command set 625 is defined as a higher-layer of the FCP 620. On the AV/C command set 625, the connection control of the AV/C isochronous transfer and control commands for so-called AV (Audio-Visual) devices such as a TV, a monitor, a VCR etc., are applied to the command frame and the response frame.

FIG. 27 shows a command frame structure of the AV/C command set 625. FIG. 28 shows a response frame structure.

"opcode" and "subfunction" in FIG. 27 distinguish between the contents of the control commands. FIGS. 29 through 31 show some commands of "VCR subunit command set" used for the VCR among the commands described above. Given herein are definitions of reproduction, recording, stop, rewinding and fast-forwarding that are required for the normal control.

Through the IEEE1394 serial bus 550 having the functions described above, the video camera 119(A), the STB 111(A) and the VCR 112(A) output the video images as the isochronous data based on the IEEE1394 serial bus.

The 1394I/F control unit 500 receives TDM-inputted (Time Division Multiplexing-inputted) isochronous data from the 1394 serial bus 550, then demultiplexes the received isochronous data, and outputs the demultiplexed data to decoders 550 through 570. Further, the 1394I/F control unit 500 has a function of issuing the AV/C commands described above.

The decoders 550 through 570 decode the isochronous data given from the 1394I/F control unit 500, thereby restoring the respective output video images from the video camera 119(A), the STB 111(A) and the VCR 112(A). Then, the decoders 550 through 570 supply the restored video images to the video image synthesization units 113(A) and 117(A). The CODEC unit 114(A), the NCU 115(A), the layout generation unit 116(A) and the display unit 118(A) operate the same as in the third embodiment. A cursor adding unit 580 adds a cursor to the video data given from the video synthesization unit 117(A), and outputs the resulted data to the display unit 118(A).

The same architecture as that of the communication terminal device 110(A) described above is given to the other communication terminal device 110(B).

It is obvious in this architecture also that the communication terminal devices 110(A) and 110(B) operate the same as in the third embodiment.

The communication terminal device 110(A) is notified the display layout information from the communication terminal device 110(B) in the case where the layout generation unit 116(B) in the communication terminal device 110(B) generated and determined the display layout as well as in the case where the layout generation unit 116(A) generates and determined the display layout, and is therefore capable of distinguishing a number of display areas and a display area size at all times. Accordingly, the cursor adding unit 580 can add the cursor indicating a highlight at the display area.

Figure 32:
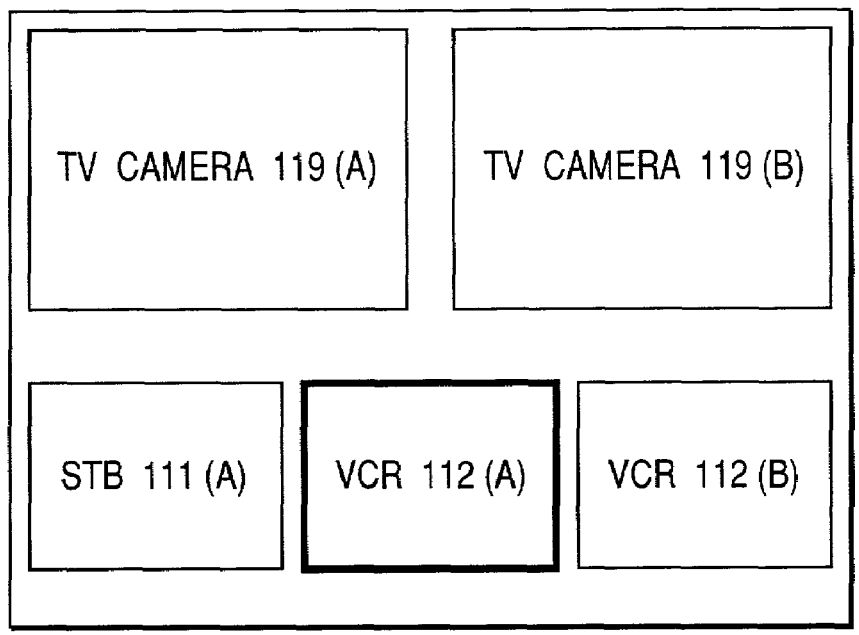
FIG. 32 is an explanatory diagram showing a cursor on the display of the video image on the basis of the display layout in the communication system.

FIG. 32 shows one example of a state in which, the cursor adding unit 580 specifies, for example, the video image shown in FIG. 6 by the cursor. Herein, the cursor is displayed as a bold-line frame of the display area for the video image from the VCR 112(A). This display mode enables the user to recognize that the video image from the VCR 112(A) is highlighted.

Figure 33:
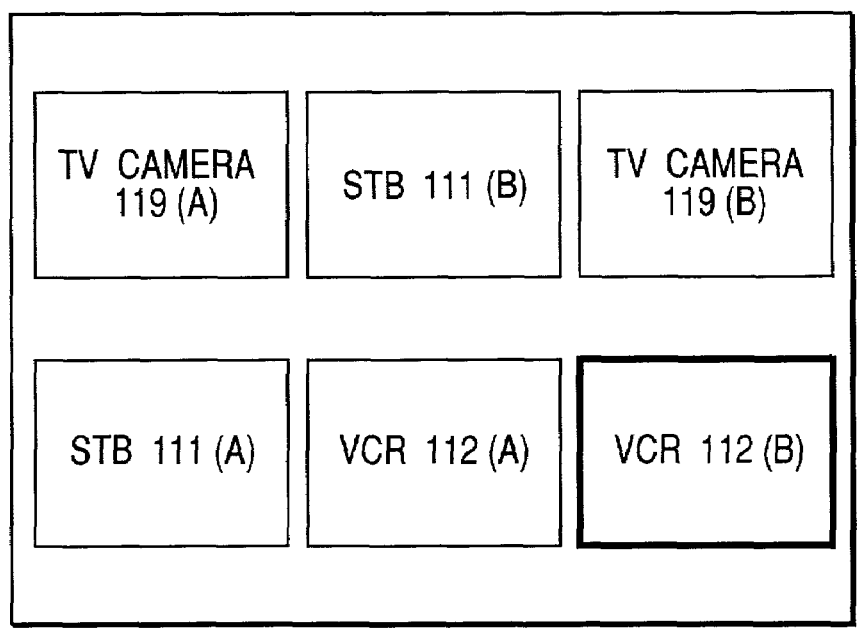
FIG. 33 is an explanatory diagram showing the cursor on the display of the video image on the basis of a new display layout upon an adding operation of the video image in the video image display state described above.

FIG. 33 shows one example of a state where the cursor adding unit 580 specifies, e.g., the video image shown in FIG. 11 by the cursor. Herein, the cursor is displayed as a bold-line frame of the This display mode enables the user to recognize that display area for the video image from the VCR 112(B). the video image from the VCR 112(B) is highlighted.

The cursor described above is structured to be vertically horizontally movable by the user operating the unillustrated remote controller or operation unit.

Characteristic operations in the fourth embodiment will hereinafter be explained.

For instance, it is assumed that the layout generation unit 116(A) in the communication terminal device 110(A) generates and determines the display layout and that the display on the display unit 118(A) is in a state as shown in FIG. 32, i.e., the cursor specifies the display area of the video image from the VCR 112(A).

In the state described above, the user A operates for fast-forward reproduction of the VCR 112(B) by use of the unillustrated remote controller or operation unit.

The communication terminal device 110(A) issues the AV/C command corresponding to the fast-forward reproduction. More specifically, the cursor specifies the display area of the video image from the VCR 112(A), as apparent from the display layout information shown in FIG. 20, this cursor-specified display area is the display area 1-3, and this display area 1-3 is determined to be the area for displaying the video image from the VCR 112(A), whereby the 1394I/F control unit 500 issues to the VCR 112(A) the AV/C command corresponding to the fast-forward reproduction according to the operation of the user A. The VCR 112(A) operates based on this AV/C command.

Figure 34:
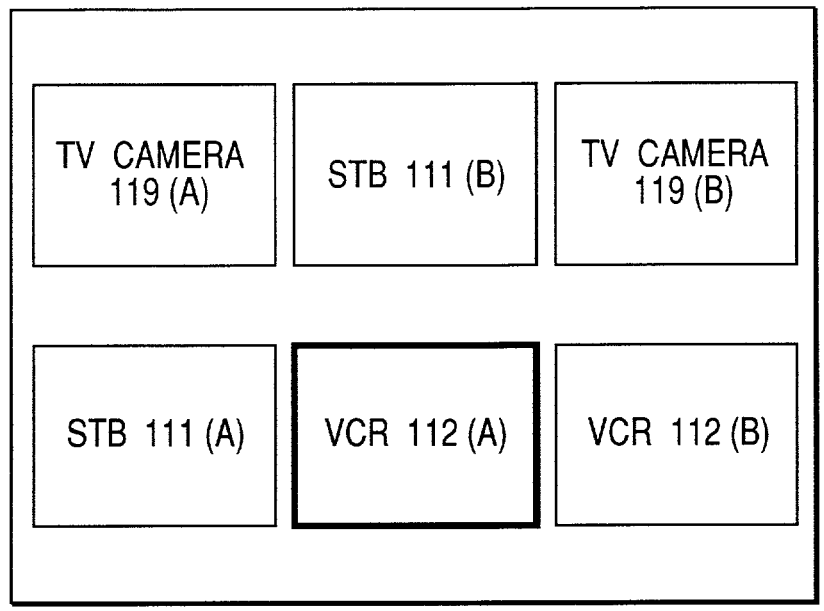
FIG. 34 is an explanatory diagram showing a movement of the cursor.

Further, for instance, it is assumed that the layout generation unit 116(A) in the communication terminal device 110(A) generates and determines the display layout and that the display on the display unit 118(A) is in a state as shown in FIG. 34, i.e., the cursor specifies the display area of the video image from the VCR 112(A).

In the state described above, the user A performs an operation for moving the cursor rightward by use of the unillustrated remote controller or operation unit.

The communication terminal device 110(A) recognizes that the cursor moves to the display area of the video image from the VCR 112(B), then sets information for indicating this cursor movement such as operation information "2-2: CURSOR", and notifies the communication terminal device 110(B) of the same operation information.

Note that it is feasible to distinguish by lengths of arguments between the display layout information and the cursor operation information as information of which the communication terminal device 110(B) is notified, however, these information may be, as a matter of course, made distinguishable by arbitrary methods.

The communication terminal device 110(B) receives the operation information from the communication terminal device 110(A), then recognizes that the cursor is moved to the display area 2-2 in the communication terminal device 110(A), and moves the cursor to the display area 2-2 on the display unit 118(B) in accordance with a content of the operation information. Therefore, it follows that the same video image containing the cursor position is provided to the users A and B.

Further, for example, it is assumed that the layout generation unit 116(B) in the communication terminal device 110(B) generates and determines the display layout and that the display on the display unit 118(B) is in a state as shown in FIG. 34, i.e., the cursor specifies the display area of the video image by the VCR 112(A).

In this state, the user B performs an operation for the fast-forward reproduction of the VCR 112(A) by use of the unillustrated remote controller or operation unit. The communication terminal device 110(B) issues the AV/C command corresponding to this fast-forward reproduction. To be specific, the cursor specifies the display area of the video image from the VCR 112(A), as apparent from the display layout information shown in FIG. 22, this cursor-specified display area is the display area 2-3, and this display area 2-3, i.e., the display area denoted with notation starting with "2" is the area for the receiver (the communication terminal device 110(A)) of the display layout information to use for displaying, and hence this receiver (the communication terminal device 110(A)) is notified of the user B's operation information (of the fastforward reproduction) "2-3: VCR, F-PLAYE".

Note that it is possible to distinguish by lengths of arguments between the display layout information and the cursor operation information as information of which the communication terminal device 110(A) is notified, however, these information may be, as a matter of course, made distinguishable by arbitrary methods.

The communication terminal device 110(A) recognizes, from the operation information given from the communication terminal device 110(B), that the fast-forward reproduction of the VCR 112(A) with respect to the display area 2-3, and causes the 1394I/F control unit 550 to issue the AV/C command corresponding to the fast-forward reproduction to the VCR 112(A). The VCR 112(A) operates based on the AV/C command. With this configuration, the user B is able to operate the VCR 112(A) on the side of the communication terminal device 110(A).

According to the fourth embodiment, as in the third embodiment, the cursor can be displayed on the synthesized video image provided to the user A or B, and the cursor manipulation by the user A and the cursor manipulation by the user B can be reflected on the synthesized image. Besides, the same video image containing the cursor position is provided to the users. Accordingly, the users A and B are able to further facilitate indicating, distinguishing and recognizing one or a plurality of video images from the synthesized video image.

Moreover, the user A gets feasible of operating the devices (the VCR 112(B) etc.) on the side of the user B, while the user similarly gets feasible of operating the devices (the VCR 112(A) etc) on the side of the user B. Further, in this case, the operation target can be automatically identified from the cursor position, and the users A and B are able to operate the devices without being aware of which side the operation target device exists on as viewed from the communication line 120.

Note that the object of the present invention can be, as a matter of course, accomplished by supplying the system or the device with a storage medium storing program codes of software for actualizing the functions of the host and the terminals in the firth through fourth embodiments, and operating a computer (a COU and an MPU) installed in the system or the device so as to read and execute the program codes stored on the storage medium.

In this case, it follows that the read-from-the-storage-medium program codes themselves realize the functions in the first through fourth embodiments, and the storage medium storing the program codes and these program codes constitute the present invention.

The storage medium for storing the program codes may involve the use of a ROM, a flexible disk, a hard disk, an optical disk, a magneto-optic disk, a CD-ROM, a CD-R, a magnetic tape, a non-volatile memory card and so on.

Further, the present invention embraces, of course, a case in which the computer reads and executes the program codes, whereby the functions in the first through fourth embodiments are realized, besides an OS (Operating System) etc running on the computer implements a part or the whole of the actual processes in accordance with instructions of the program codes to realize the functions in the first through fourth embodiments.

Still further, the present invention, needless to say, embraces a case in which the program codes read from the storage medium are written into a memory installed in a function-enhanced board (extended board) inserted into the computer or in a function-enhanced unit connected to the computer, thereafter the CPU provided in the function-enhanced board or the function-enhanced unit executes a part or the whole of the actual processes on the basis of the instructions of the program codes to realize the functions in the first through fourth embodiments.

Figure 35:
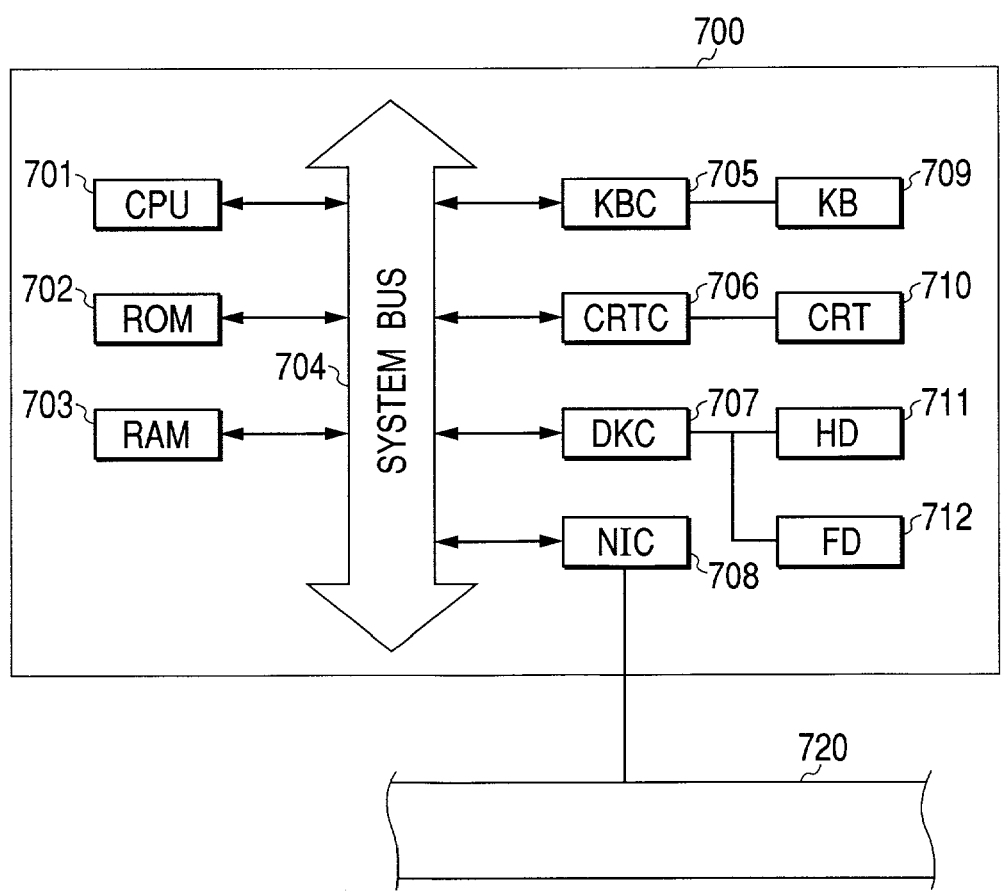
FIG. 35 is a block diagram showing a configuration of a computer reading a program from a readable-by-computer storage medium and executing this program to actualize a function of the communication system.

FIG. 35 shows a function 700 of the computer described above.

The computer function 700 has such a configuration that as shown in FIG. 35, a CPU 701, a ROM 702, a RAM 703, a keyboard controller (KBC) 705 for a keyboard 709, a CRT controller (CRTC) 706 for a CRT display (CRT) 710 serving as the display unit, a disk controller (DKC) 707 for a hard disk (HD) 711 and a flexible disk (FD) 712 and a network interface controller (NIC) 708 for a connection to a network 720, are so connected to a system bus 704 as to be communicable with each other.

The CPU 701 executes the software stored on the ROM 702 or the HD 711 or the software supplied from the FD 712, thereby controlling the respective components in unity that are connected to the system bus. Namely, the CPU 701 reads the processing program based on a predetermined processing sequence from the ROM 702 or the HD 711 or the FD 712, and executes this program, thereby effecting the control for realizing the operations in the first through fourth embodiments.

The RAM 703 functions as a main memory or a work area etc on the CPU 701. The KBC 705 controls an instruction input from the KB 709 or an unillustrated pointing device. The CRTC 706 controls the display on the CRT 710. The DKC 707 controls accesses to the HD 711 and the FD 712 storing a boot program, various categories of applications, edit files, user files, a network administration program and the predetermined processing programs in the embodiments. The NIC 708 transfers and receives the data bidirectional among the devices on the network 720 and the system.

As discussed above, the present invention adopts the architecture in which the plurality of video images from the communication party and the local terminal are synthesized and displayed in accordance with the display layout common to the remote terminal and the local terminal, which is determined based on the number of video images displayed on the remote terminal and the number video images displayed on the local terminal. This architecture facilitates indicating, distinguishing and recognizing the single or the plurality of video images from the synthesized video image on the remote terminal and the local terminal, respectively.

Further, if configured to transmit the synthesized video image of the plurality of video images based on the display layout in the case of transmitting the plurality of video images to the communication party, or if configured to receive the synthesized video image of the plurality of video images based on the display layout in the case of receiving the plurality of video images from the communication party, there are required neither a plurality of communication units for transmitting and A receiving the plurality of video images nor the time-division multiplexing unit nor the demultiplexing unit, with the result that the costs can be reduced down.

Further, if configured so that the cursor is so displayed as to be movable onto the synthesized video image and so that the cursor manipulations on the remote terminal and on the local terminal can be reflected on the synthesized video image, it is possible to further facilitate indicating, distinguishing and recognizing the single or the plurality of video images from the synthesized video image. Moreover, if configured so that the video image in the synthesized video image is controlled as the cursor moves, the video image on the remote terminal can be manipulated as well as on the local terminal.

Many widely different embodiments of the present invention may be constructed without departing from the spirit and scope of the present invention. It should be understood that the present invention is not limited to the specific embodiments described in the specification, except as defined in the appended claims.

What is claimed is:

1. A communication apparatus with a video image display function, for transmitting and receiving data to and from an other communication apparatus, said apparatus comprising:
communication means for receiving, from said other communication apparatus, video data and data indicating a number of display video images to be displayed on said other communication apparatus;
determining means for determining a display layout in accordance with the received data indicating the number of display video images to be displayed on said other communication apparatus and data indicating a number of display video images to be displayed on said communication apparatus so that a video image on said other communication apparatus and a video image on said communication apparatus are displayed on the same screen;
first synthesizing means for synthesizing the video data received from said other communication apparatus with video data on said communication apparatus in accordance with the display layout determined by said determining means; and
display control means for effecting control so as to display a first synthesized video image obtained by said first synthesizing means on a display means.

2. An apparatus according to claim 1, wherein the communication means transmits information as to the display layout determined by said determining means to said other communication apparatus, and
said apparatus further comprises second synthesizing means for synthesizing the video data on said communication apparatus in accordance with the display layout determined by said determining means,
wherein said communication means transmits the video data obtained by said second synthesizing means to said other communication apparatus.

3. An apparatus according to claim 2, wherein said first synthesizing means further synthesizes the video data synthesized by said second synthesizing means with the video data on said other communication apparatus which is received by said communication means.

4. An apparatus according to claim 1, further comprising:
selecting means for selecting an arbitrary video image from the first synthesized video image displayed on said display means; and control means for effecting control so as to perform a predetermined operation on the video image selected by said selecting means, and to further control a video image corresponding to the selected video image displayed on said other communication apparatus.

5. An apparatus according to claim 4, wherein said control means effects control so as to perform a predetermined operation on a video image corresponding to the video image selected on said other communication apparatus, among the first synthesized video image displayed on said display means.

6. An apparatus according to claim 1, wherein said determining means displays a predetermined video image from among the display video images on said other communication apparatus at a predetermined position on a screen on said communication apparatus, and determines the display layout so as to display the predetermined video image from among the display video images on said communication apparatus, at the predetermined position on a screen on said other communication apparatus.

7. An apparatus according to claim 6, wherein the predetermined video image on said communication apparatus is a video image obtained by a video camera associated with said communication apparatus, and the predetermined video image on said other communication apparatus is a video image obtained by a video camera associated with said other communication apparatus.

8. An apparatus according to claim 1, wherein said determining means re-determines the display layout in accordance with a change instruction of the number of display video images on said communication apparatus and/or the number of display video images on said other communication apparatus.

9. A video image display control method for controlling display of a plurality of video images obtained from at least a first video image processing system and a second video image processing system each having a communication function, said method comprising:

a receiving step for receiving, from the second video image processing system, video data and data indicating a number of display video images to be displayed on the second video image processing system;

a determining step for determining a display layout of the plurality of video images in accordance with the received data indicating the number of display video images to be displayed on the second video processing system, and data indicating a number of display video images to be displayed on said first video image processing system so that the plurality of video images obtained from said first video image processing system and said second video image processing system are displayed on a same screen;

a synthesizing step for synthesizing the plurality of video images obtained from said first video image processing system and said second video image processing system on the basis of the display layout determined in said determining step; and a displaying step for displaying the synthesized video images obtained in said synthesizing step.

10. A computer readable storage medium on which is stored code for a computer executable program for a video image display control method for controlling display of a plurality of video images obtained from at least a first video image processing system and a second video image processing system each having a communication function, said method comprising:

a receiving step for receiving, from the second video image processing system, video data and data indicating a number of display video images to be displayed on the second video image processing system;

a determining step for determining a display layout of the plurality of video images in accordance with the received data indicating the number of display video images to be displayed on the second video processing system, and data indicating a number of display video images to be displayed on said first video image processing system so that the plurality of video images obtained from said first video image processing system and said second video image processing system are displayed on a same screen;

a synthesizing step for synthesizing the plurality of video images obtained from said first video image processing system and said second video image processing system on the basis of the display layout determined in said determining step; and a displaying step for displaying the synthesized video images obtained in said synthesizing step.

* * * * *

UNITED STATES PATENT AND TRADEMARK OFFICE
CERTIFICATE OF CORRECTION

PATENT NO. : 7,231,603 B2
APPLICATION NO. : 10/165320
DATED : June 12, 2007
INVENTOR(S) : Matsumoto It is certified that error appears in the above-identified patent and that said Letters Patent is hereby corrected as shown below:

SHEET 20:
Fig. 30, "LOARD MEDIUM" should read -- LOAD MEDIUM --.

COLUMN 6:
Line 48, "vide" should read -- video --.

COLUMN 17:
Line 11, "hereinafter" should read -- hereinafter be --;
Line 17, "tow" should read -- two --.

COLUMN 18:
Line 67, "frame of the" should read -- frame. --.

COLUMN 19:
Line 2, "the" should read -- The --.

COLUMN 20:
Line 41, "the user A gets feasible of operating" should read -- it is feasible for user A to operate --;
Line 43, "user similarly gets feasible of operating" should read -- user is similarly feasible of operating --; and
Line 54, "firth" should read -- first --.

COLUMN 21:
Line 55, "number" should read -- number of --.

UNITED STATES PATENT AND TRADEMARK OFFICE
CERTIFICATE OF CORRECTION

PATENT NO. : 7,231,603 B2
APPLICATION NO. : 10/165320
DATED : June 12, 2007
INVENTOR(S) : Matsumoto It is certified that error appears in the above-identified patent and that said Letters Patent is hereby corrected as shown below:

COLUMN 22:
Line 1, "A" should be deleted.

COLUMN 24:
Line 7, "sanc" should read -- same --.

Signed and Sealed this

Twenty-second Day of July, 2008

JON W. DUDAS
*Director of the United States Patent and Trademark Office*